United States Patent [19]
Naruse et al.

[11] Patent Number: 5,572,502
[45] Date of Patent: Nov. 5, 1996

[54] OPTICAL DISK APPARATUS

[75] Inventors: Atsuko Naruse, Hitachi; Yoshihito Maeda, Mito; Yoshimi Kato, Takahagi; Isao Ikuta, Iwaki; Hisashi Andoh, Hitachi; Masaichi Nagai, Hitachi; Yoshio Sato, Hitachi; Tetsuya Fushimi, Kokubunji; Hiroyuki Minemura, Kodaira; Tatsuya Sugita, Hitachi, all of Japan

[73] Assignee: Hitachi, Ltd., Tokyo, Japan

[21] Appl. No.: 313,803

[22] Filed: Sep. 28, 1994

[30] Foreign Application Priority Data

Sep. 28, 1993 [JP] Japan .................................. 5-240935
Feb. 15, 1994 [JP] Japan .................................. 6-018652
Feb. 18, 1994 [JP] Japan .................................. 6-021282

[51] Int. Cl.$^6$ ........................................................ G11B 7/00
[52] U.S. Cl. .......................... 369/116; 369/13; 369/126; 369/275.3
[58] Field of Search .............................. 369/116, 13, 126, 369/99, 100, 106, 120, 124, 275.2, 275.3; 360/59, 40, 48, 51, 52, 114, 118, 66

[56] References Cited

U.S. PATENT DOCUMENTS

| 5,060,208 | 10/1991 | Nagai et al. ............................... 369/13 |
| 5,126,994 | 6/1992 | Ogawa et al. ............................ 369/116 |
| 5,327,414 | 7/1994 | Makino et al. ........................... 369/116 |
| 5,388,090 | 2/1995 | Hoshino et al. ....................... 369/275.3 |
| 5,414,689 | 5/1995 | Maeda et al. ............................ 369/116 |

FOREIGN PATENT DOCUMENTS

| 62-80865 | 4/1987 | Japan . |
| 2-172039 | 7/1990 | Japan . |
| 3-150725 | 6/1991 | Japan . |
| 3-292631 | 12/1991 | Japan . |
| 3-278320 | 12/1991 | Japan . |

*Primary Examiner*—Loha Ben
*Attorney, Agent, or Firm*—Antonelli, Terry, Stout & Kraus

[57] ABSTRACT

An optical disk apparatus includes a recording method in which at least one of the scanning position, the irradiation time, the irradiation start point and the irradiation power of a light beam is arbitrarily changed, and a method and apparatus in which information is represented by a plurality of recording marks without being limited to two kinds of recording and erasion. In order to prevent overlapping recording/erasion, a recording clock generating unit delays a reference clock signal to generate a recording clock signal and a recording control unit transfers user data to an optical head in synchronism with the recording clock signal so that it is recorded on an optical disk. Also, the amount of delay is recorded to enable sure reading or reproduction. At the time of reading, a servo mark detection signal is divided to generate a clock signal having a variable frequency, thereby realizing an optical disk for which high-precision recording/reproduction is possible.

10 Claims, 28 Drawing Sheets

▬ RECORDED PORTION

☐ NON-RECORDED PORTION

FIG.2
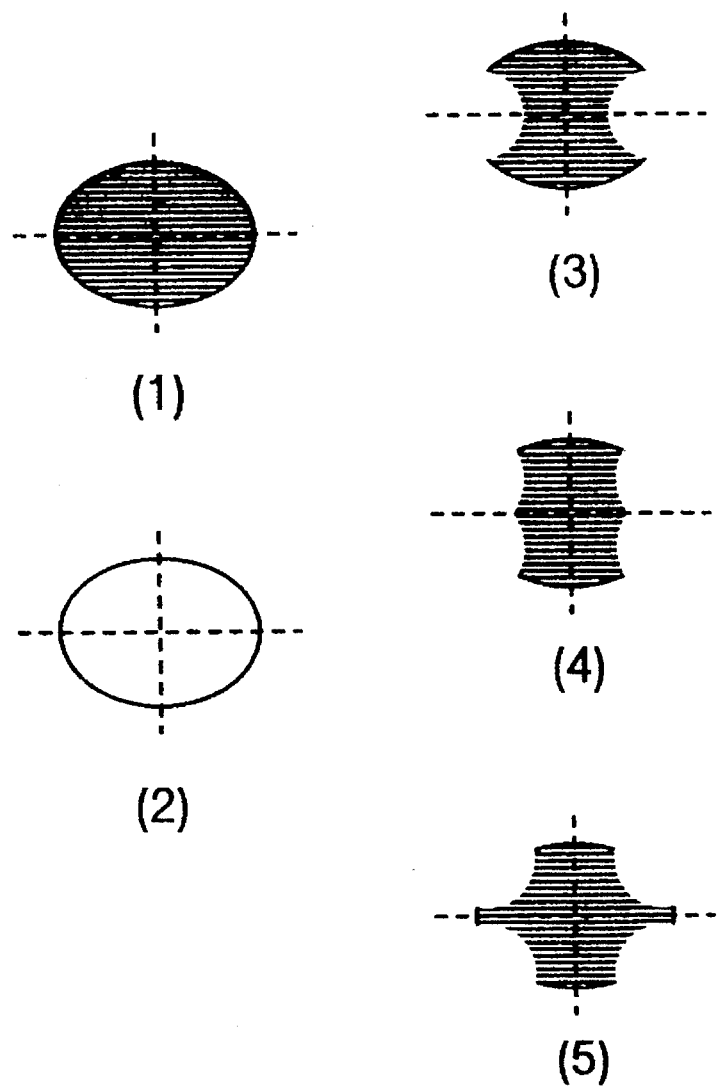
(1)
(2)
(3)
(4)
(5)
 RECORDED PORTION
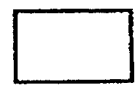 NON-RECORDED PORTION

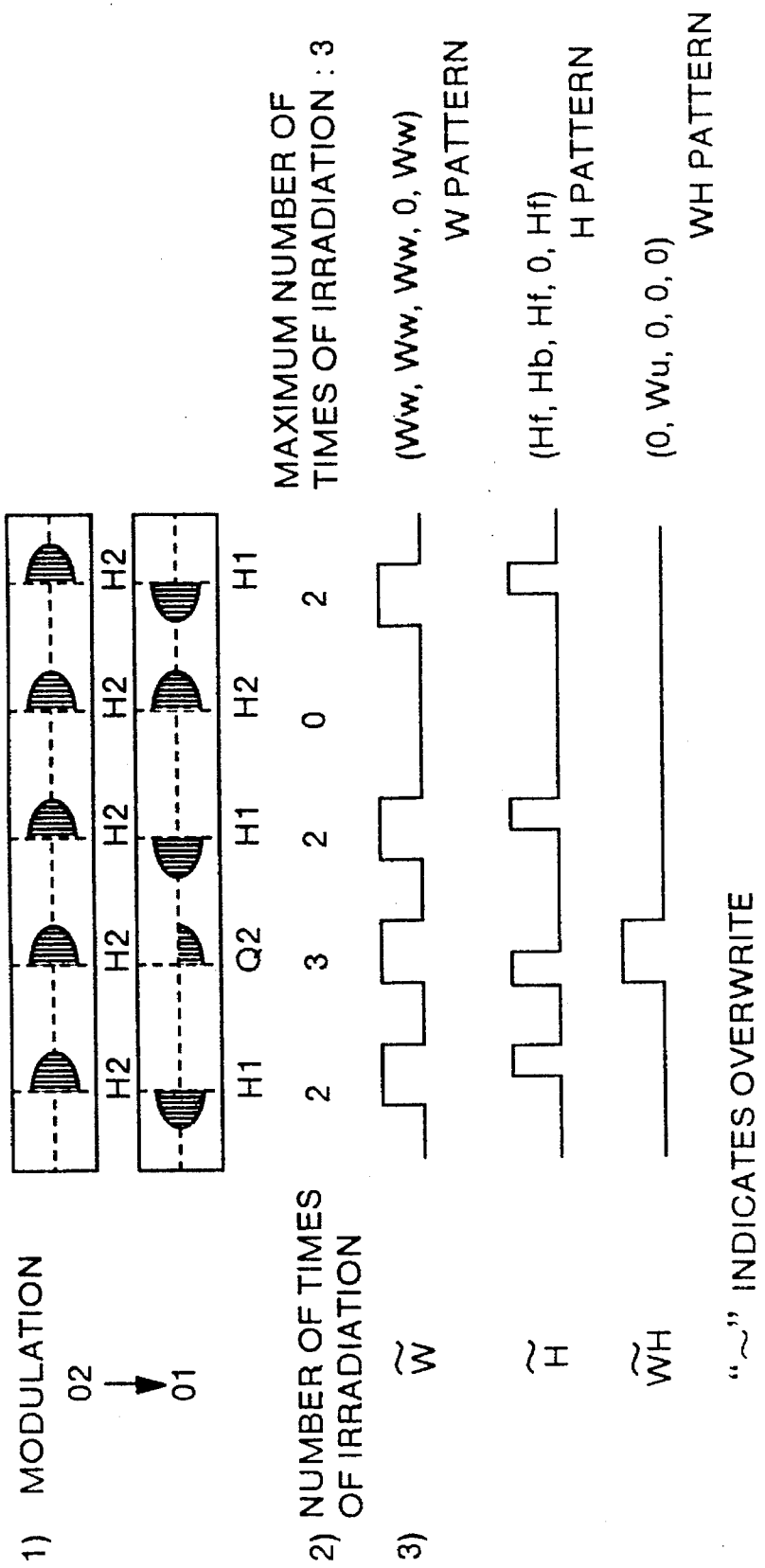

FIG.11

| DELAY SETTING VALUE | DELAY AMOUNT (ns) | DELAY AMOUNT RECORDING DATA 1001 IN DELAY AMOUNT RECORDING REGION 404 | | | | | | | | |
|---|---|---|---|---|---|---|---|---|---|---|
| | | 1 | 2 | 3 | 4 | 5 | 6 | 7 | 8 | 9 |
| 0 | 0 | MARK PRESENT | ABSENT | ABSENT | ABSENT | ABSENT | ABSENT | ABSENT | ABSENT | ABSENT |
| 1 | 5 | ABSENT | PRESENT | ABSENT | ABSENT | ABSENT | ABSENT | ABSENT | ABSENT | ABSENT |
| 2 | 10 | ABSENT | ABSENT | PRESENT | ABSENT | ABSENT | ABSENT | ABSENT | ABSENT | ABSENT |
| 3 | 15 | ABSENT | ABSENT | ABSENT | PRESENT | ABSENT | ABSENT | ABSENT | ABSENT | ABSENT |
| 4 | 20 | ABSENT | ABSENT | ABSENT | ABSENT | PRESENT | ABSENT | ABSENT | ABSENT | ABSENT |
| 5 | 25 | ABSENT | ABSENT | ABSENT | ABSENT | ABSENT | PRESENT | ABSENT | ABSENT | ABSENT |
| 6 | 30 | ABSENT | ABSENT | ABSENT | ABSENT | ABSENT | ABSENT | PRESENT | ABSENT | ABSENT |
| 7 | 35 | ABSENT | ABSENT | ABSENT | ABSENT | ABSENT | ABSENT | ABSENT | PRESENT | ABSENT |
| 8 | 40 | ABSENT | ABSENT | ABSENT | ABSENT | ABSENT | ABSENT | ABSENT | ABSENT | PRESENT |
| 9 | 45 | ABSENT | ABSENT | ABSENT | ABSENT | ABSENT | ABSENT | ABSENT | ABSENT | ABSENT |

FIG.20A

| PARTITION #i | PARTITION #i+1 | PARTITION #i+2 |
|---|---|---|
| ZONE #n | | |

FIG.20B

| PARTITION #i | PARTITION #i+1 | PARTITION #i+2 |
|---|---|---|
| ZONE #n | ZONE #n+1 | ZONE #n+2 |

FIG.20C

| PARTITION #i | | |
|---|---|---|
| ZONE #n | ZONE #n+1 | ZONE #n+2 |

OPTICAL DISK APPARATUS

BACKGROUND OF THE INVENTION

The present invention relates to an information recording method and information recording/reproducing system utilizing light, heat or magnetization, and more particularly to an optical disk apparatus in which control effective for recording/reproduction is adopted.

An optical change caused by the presence/absence of information recorded portions is detected (see Philips Technical Review, Vol. 40, 1982, No. 6, pp. 157–164), and a beam on one track is scanned once in the track direction so that the recording/reproduction of information is made in the form of a binary signal. As means for providing an improved recording with a high density are known (1) a method, as disclosed by JP-A-3-278320, in which the recording is made with the track pitch of information recording and the pit pitch of information portions being narrowed and (2) a many-valued recording method in which one information is represented by a plurality of pits. As the many-valued recording method, JP-A-3-292631 has disclosed a method in which three-valued digitization is made by homologically changing the size of a pit and JP-A-2-172039 has disclosed a method in which many-valued digitization is made by letting the arrangement of the same pit (or the presence/absence of a pit) have information.

Also, there is a problem that when the writing and erasion of data having the same content are repeated, the same location of a medium is repeatedly irradiated with a laser beam and hence that portion of the medium is deteriorated, thereby resulting in the deterioration of the sensitivity of reproduction. In order to solve this problem, JP-A-3-150725 has proposed a method in which the time of a write data signal is adjusted to shift the writing position of data, thereby suppressing the deterioration of an information recording medium.

Further, JP-A-62-80865 has proposed an optical disk apparatus in which both an MCAV (Modulate Constant Angular Velocity) system and a CAV (Constant Angular Velocity) system can be handled by providing means for changing the frequency of a reference clock signal in accordance with a track position. The MCAV system is a system in which the timing of recording/reproduction is changed in accordance with a track position, and the CAV system is a system in which the recording/reproduction is made with the rotation velocity of a disk being kept constant. Nikkei Byte, 1992, No. 1, pp. 120–133 has disclosed other systems including a CLV (Constant Linear Velocity) system in which the recording/reproduction is made with a linear velocity being kept constant.

As has been mentioned, a technique of making the recording at spatially closed intervals, which is one of high-density recording methods, has a limitation. Therefore, the many-valued recording method has been proposed in which the recording density in the same space is improved. However, the proposed many-valued recording method involves a problem that if a recording or irradiation power is not further enhanced, further many-valued digitization cannot be expected but the higher irradiation power causes a change in form of a recording portion and the thermal deterioration of a substrate. On the other hand, the many-valued recording method in which one information is represented by a plurality of pits having the same form, is the same as the concept in which the size of a pit is made small to provide a spatially closed interval. In order to arrange pits of the same form with a high efficiency, it is necessary to always move the scanning position of a beam in a track width direction with an irradiation start point and an irradiation time being kept constant.

Also, the JP-A-3-150725 proposing the method of performing the writing with the data writing position being shifted in order to prevent the deterioration of the recording medium does not disclose the manner of reproduction. If a reference clock signal is generated on the basis of reference positions (or servo marks) preformatted on a medium and the recording/reproduction is made in synchronism with the generated reference clock signal, as in an information recording medium based on a sample servo format, there is a problem that the shifted recording of data makes it impossible to reproduce the data since a reproduced signal is not synchronous with the reference clock signal.

Further, in the case were the recording/reproduction is made on the basis of the CAV system, there is employed a sample servo system in which a recording capacity is small but the construction of an optical system is simple, thereby making it possible to reduce the size of the apparatus. In the sample servo system, it is possible to detect data, a focusing error and a tracking error by detecting servo marks radially preformatted on an optical disk and time-dividing the servo marks.

However, in the MCAV system or the like, the frequency of a reference clock signal must be changed for each zone or track. Therefore, in the case where the sample servo system is employed in the MCAV system or the like, there is a fear that when access from one zone to the adjacent or next zone is made, it becomes impossible to detect servo marks at a predetermined timing. If the detection of the servo marks becomes impossible in the sample servo system, there is a problem that it becomes impossible not only to make the recording/reproduction but also to have a light beam follow the track.

SUMMARY OF THE INVENTION

A first object of the present invention made for solving the above-mentioned problems is to provide a recording method in which the representation of a plurality of information by one pit is made possible by letting a shaped pit form itself have information and the reduction of the influence of a thermal deterioration and the improvement of a recording density are made through the combined use of a partial erasion method for a recording portion corresponding to one pit information and by arbitrarily selecting a beam irradiation scanning position, an irradiation time, an irradiation start point and an irradiation power, a recording system in which information is represented using a recording mark formed through partial division recording and a recording/reproducing system in which a recording mark formed through partial division recording is used.

A second object of the present invention is to provide an optical disk apparatus in which the recording, reproduction and erasion can be realized with the position of write data being shifted in order to suppress the deterioration of an information recording medium.

A third object of the present invention is to provide an optical disk apparatus in which the reproduction from an information recording medium (or optical disk) having data recorded with a high density is possible notwithstanding that a sample servo system is used.

According to the present invention, there are provided a recording method which includes an operation of partially erasing a recording mark in such a manner that irradiation with a power enough for an erasing action is made while changing at least one of the scanning position, the irradiation time and the irradiation start point of a light beam converged on an information recording medium, a recording system in which information is represented by recording marks and non-recorded portions having plural or more forms, and a recording method which includes an operation of partially erasing a recording mark in such a manner that irradiation with a power enough for an erasing action is made while changing at least one of the scanning position, the irradiation time and the irradiation start point of a light beam converged on an information recording medium and in which information is represented by recording marks and non-recorded portions having plural or more forms.

An optical disk apparatus of the present invention is provided with a recording medium having a region in which a mark representative of reference position data for generating a reference clock signal is beforehand formed, an optical head for recording and reproducing a mark representative of data on and from the recording medium, reference clock signal generating means for generating a reference clock signal from a signal of the mark representative of the reference position data reproduced by the optical head, recording control means for transferring a signal representative of data to be recorded to the optical head in synchronism with a clock signal, and reproduction control means for reading data from the signal reproduced by the optical head in synchronism with a clock signal.

Further, the apparatus may be provided with recording clock generating means for delaying the reference clock signal to generate the clock signal which the recording control means uses, means for storing the amount of delay by the recording clock generating means, and reproduction clock generating means for reading the delay amount stored in the storing means to delay the reference clock signal by the delay amount, thereby generating the clock signal which the reproduction control means uses.

Irradiation with a power for an erasing action is applied as a method for the form shaping of a recording portion aimed at many-valued digitization. Thereby, the thermal deterioration is avoided. Further, many-valued recording becomes possible with more kinds than that in the case where the many-valued digitization is tried by use of only the change of an irradiation power. Thereby, the recording density is improved.

The clock signal used by the recording control means is generated by delaying the reference clock signal by the recording clock generating means.

The amount of delay from the reference clock signal can be determined by selecting one of predetermined amounts or generating a numeric value representative of an amount by use of random numbers. Since a signal delayed from the reference clock signal is used as a clock signal by the recording control means, the position of a mark formed on an optical disk is shifted in accordance with the amount of delay. Accordingly, even in the case where the same data is repeatedly recorded, the deterioration of a recording medium caused by the repeated irradiation of the same location of the recording medium with a laser beam is prevented since the position of a mark is shifted depending on the amount of delay of the clock signal.

The amount of delay of the reference clock signal by the recording clock generating means is stored in the storing means.

In the case where data of a mark written in the optical disk is to be reproduced, a clock signal to be used for reproduction is obtained by the reproduction clock generating means in such a manner that the reproduction clock generating means reads the delay amount stored in the storing means to obtain the delay amount when that mark was recorded and delaying the reference clock signal by the same amount as the read delay amount. The reproduction control means uses the obtained clock signal, thereby making it possible to reproduce data from the mark which was formed at a shifted position at the time of recording.

BRIEF DESCRIPTION OF THE DRAWINGS

FIG. 2 is a diagram showing examples of the shaping of a recording mark utilizing the dependency of the existing position of the maximum rate of crystallization on an irradiation power;

FIG. 4 is a diagram showing an example of an operation in an optical recording/reproducing system according to the present invention;

FIG. 11 is a diagram showing a relationship between a delay setting value, the amount of delay and delay amount recording data in the optical disk apparatus shown in FIG. 6;

FIGS. 20A, 20B and 20C are diagrams showing a relationship between partitions and zones in the case where the partitions are arranged;

DESCRIPTION OF THE PREFERRED EMBODIMENTS

First, explanation will be made of a high-density recording method of the present invention.

Figure 1:
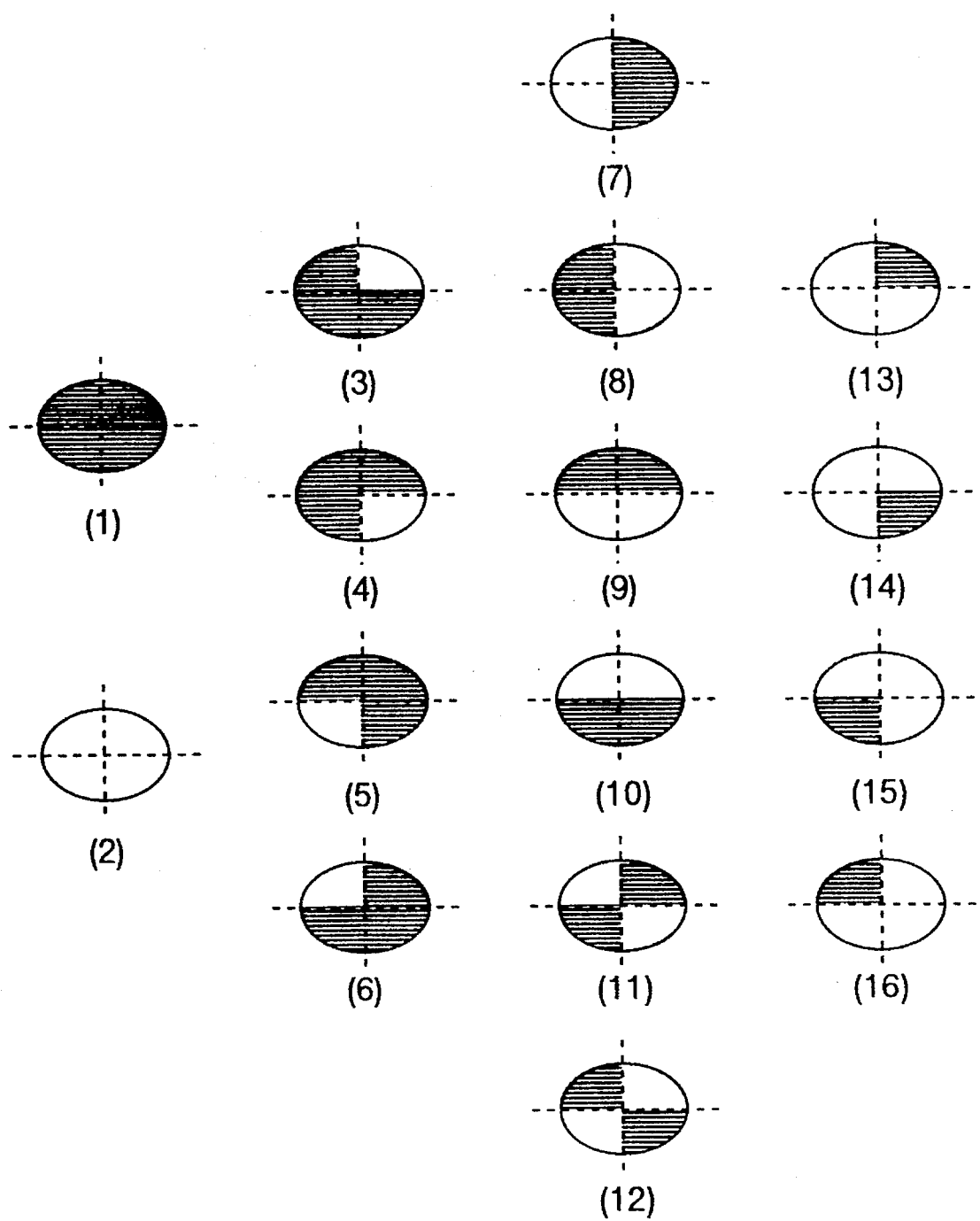
FIG. 1 is a diagram showing the form of a recording mark formed when division into four equal parts is made.

FIG. 1 shows the forms of basic recording marks using the present invention.

The shown mark forms are formed when a recording mark is equally divided into four parts in up/down and right/left directions. In the conventional recording method, information is represented by two kinds of pits including recording ("1") and erasion ("0").

In the present invention, it becomes possible to represent information by use of the combination of pit forms shown in FIG. 1, that is, a total of sixteen kinds of forms which include the kinds of forms (3) to (16) shown in FIG. 1 in addition to the conventionally used forms (1) and (2) (or "1" and "0" information). However, if the same method as the conventional recording method is used for forming those recording marks, the form of a pig becomes large with the result that the improvement of a reading rate and the increase of an information recording density cannot be expected. Minute recording marks can be formed in the following manner.

A method of partially shaping a recording mark will be explained with a general classification into four cases as follows:

(1) the case where the irradiation scanning center of a light beam is arbitrarily moved and an erasing power causing perfect erasion in an irradiated region is applied;

(2) the case where the light beam irradiation scanning center is made the same and an erasing power causing no erasion in the whole of the irradiated region is applied;

(3) the case where the light beam irradiation scanning center is arbitrarily moved and an erasing power causing no erasion in the whole of the irradiated region is applied; and (4) the case where the light beam irradiation scanning center is arbitrarily moved and an erasing power causing no erasion in the whole of the irradiated region or perfect erasion in the irradiated region is applied.

It is assumed that the original form of a recording mark is elliptic.

The partial shaping method, in the case (1) where the light beam irradiation scanning center is arbitrarily moved and an erasing power causing perfect erasion in the irradiated region is applied, will be mentioned by way of example in conjunction with the case where a recording mark is equally divided into four parts.

Regarding the kind of the form of a recording mark, fourteen kinds of forms (3) to (16) as well as the conventional forms (1) and (2) are generated, as explained in conjunction with FIG. 1. Thereby, information is represented by a total of sixteen kinds of recording marks.

The recording mark is formed as follows.

In the case where a mark having a different form is formed in the same area as the area of a recording mark used in the conventional method or in the case where the form of a mark is shaped within the recording mark area used in the conventional method, there may be considered a total of seventeen kinds of forming methods in which operations of making irradiation with an erasing power with at least one of the scanning center, the irradiation time and the irradiation start point of a light beam being changed are added to three conventional operations of recording mark formation, non-irradiation and perfect erasion.

Table 1 shows the interproduct of the seventeen kinds of operation functions.

TABLE 1

| | OPERATION FUNCTION | | | | | | | |
|---|---|---|---|---|---|---|---|---|
| fw | fw<br>fw | f(1,1)<br>fw | f(B/2,1)<br>fw | f(F/2,1)<br>fw | f(0,1)<br>fw | f(1,B/2)<br>fw | f(B/2,B/2)<br>fw | f(F/2,B/2)<br>fw |
| f(1,1) | f(1,1) | f(1,1) | f(1,1) | f(1,1) | f(1,1) | f(1,1) | f(1,1) | f(1,1) |
| f(B/2,1) | fw(F/2,0) | f(1,1) | f(B/2,1) | f(1,1) | f(B/2,1) | f(1,1) | f(B/2,1) | f(F/2,1) |
| f(F/2,1) | fw(B/2,0) | f(1,1) | f(1,1) | f(F/2,1) | f(B/2,1) | f(1,1) | f(1,1) | f(F/2,1) |
| f(0,1) | fw(1,0) | f(1,1) | f(B/2,1) | f(F/2,1) | f(0,1) | f(1,1) | f(B/2,1) | f(F/2,1) |
| f(1,B/2) | fw(0,F/2) | f(1,1) | f(1,1) | f(1,1) | f(1,1) | f(1,B/2) | f(1,B/2) | f(1,B/2) |

TABLE 1-continued

| \multicolumn{9}{c}{OPERATION FUNCTION} |
|---|---|---|---|---|---|---|---|---|
| f(B/2,B/2) | fw(F/2,F/2) | f(1,1) | f(B/2,1) | f(1,1) | f(B/2,1) | f(1,F/2) | f(B/2,B/2) | f(1,B/2) |
| f(F/2,B/2) | fw(B/2,F/2) | f(1,1) | f(1,1) | f(F/2,1) | f(F/2,1) | f(1,F/2) | f(1,B/2) | f(F/2,B/2) |
| f(0,B/2) | fw(1,F/2) | f(1,1) | f(B/2,1) | f(F/2,1) | f(F/2,1) | f(0,1) | f(1,F/2) | f(B/2,B/2) | f(F/2,B/2) |
| f(1,F/2) | fw(0,B/2) | f(1,1) | f(1,1) | f(1,1) | f(1,1) | f(1,1) | f(1,1) | f(1,1) |
| f(B/2,F/2) | fw(F/2,B/2) | f(1,1) | f(B/2,1) | f(1,1) | f(B/2,1) | f(1,1) | f(B/2,1) | f(1,1) |
| f(F/2,F/2) | fw(B/2,B/2) | f(1,1) | f(1,1) | f(F/2,1) | f(F/2,1) | f(1,1) | f(1,1) | f(F/2,1) |
| f(0,F/2) | fw(1,B/2) | f(1,1) | f(B/2,1) | f(F/2,1) | f(F/2,1) | f(0,1) | f(1,1) | f(B/2,1) | f(F/2,1) |
| f(1,0) | fw(0,1) | f(1,1) | f(1,1) | f(1,1) | f(1,1) | f(1,B/2) | f(1,B/2) | f(1,B/2) |
| f(B/2,0) | fw(F/2,1) | f(1,1) | f(B/2,1) | f(1,1) | f(B/2,1) | f(1,B/2) | f(B/2,B/2) | f(1,B/2) |
| f(F/2,0) | fw(B/2,1) | f(1,1) | f(1,1) | f(F/2,1) | f(F/2,1) | f(1,B/2) | f(1,B/2) | f(F/2,B/2) |
| f(0,0) | fw | f(1,1) | f(F/2,1) | f(F/2,1) | f(0,1) | f(1,B/2) | f(B/2,B/2) | f(F/2,B/2) |
| f(0,B/2) fw | f(1,F/2) fw | f(B/2,F/2) fw | f(F/2,F/2) fw | f(0,F/2) fw | f(1,0) fw | f(B/2,0) fw | f(F/2,0) fw | f(0,0) fw |
| f(1,1) | f(1,1) | f(1,1) | f(1,1) | f(1,1) | f(1,1) | f(1,1) | f(1,1) | f(1,1) |
| f(B/2,1) | f(1,1) | f(B/2,1) | f(1,1) | f(B/2,1) | f(1,1) | f(B/2,1) | f(1,1) | f(B/2,1) |
| f(F/2,1) | f(1,1) | f(1,1) | f(F/2,1) | f(0,1) | f(1,1) | f(1,1) | f(F/2,1) | f(F/2,1) |
| f(0,1) | f(1,1) | f(B/2,1) | f(F/2,1) | f(0,1) | f(1,1) | f(B/2,1) | f(F/2,1) | f(0,1) |
| f(1,B/2) | f(1,1) | f(1,1) | f(1,1) | f(1,1) | f(1,B/2) | f(1,B/2) | f(1,B/2) | f(1,B/2) |
| f(0,B/2) | f(1,1) | f(B/2,1) | f(1,1) | f(B/2,1) | f(1,B/2) | f(B/2,B/2) | f(1,B/2) | f(B/2,B/2) |
| f(F/2,B/2) | f(1,1) | f(1,1) | f(F/2,1) | f(F/2,1) | f(1,B/2) | f(1,B/2) | f(F/2,B/2) | f(F/2,B/2) |
| f(0,B/2) | f(1,1) | f(B/2,1) | f(F/2,1) | f(0,1) | f(1,B/2) | f(B/2,B/2) | f(F/2,B/2) | f(0,B/2) |
| f(1,1) | f(1,F/2) | f(1,B/2) | f(1,F/2) | f(1,F/2) | f(1,F/2) | f(1,F/2) | f(1,F/2) | f(1,F/2) |
| f(B/2,1) | f(1,F/2) | f(B/2,F/2) | f(1,F/2) | f(B/2,F/2) | f(1,F/2) | F(B/2,F/2) | f(1,F/2) | f(B/2,F/2) |
| f(F/2,1) | f(1,F/2) | f(1,F/2) | f(F/2,F/2) | f(F/2,F/2) | f(1,F/2) | f(1,F/2) | f(F/2,F/2) | f(F/2,F/2) |
| f(0,1) | f(1,F/2) | f(B/2,F/2) | f(F/2,F/2) | f(0,F/2) | f(1,F/2) | f(B/2,F/2) | f(F/2,F/2) | f(0,F/2) |
| f(1,B/2) | f(1,F/2) | f(1,F/2) | f(1,F/2) | f(1,F/2) | f(1,0) | f(1,0) | f(F/2,0) | f(1,0) |
| f(B/2,B/2) | f(1,F/2) | f(B/2,F/2) | f(1,F/2) | f(B/2,F/2) | f(1,0) | f(B/2,0) | f(1,0) | f(B/2,0) |
| f(F/2,B/2) | f(1,F/2) | f(1,F/2) | f:F/2,F/2) | f(F/2,F/2) | f(1,0) | f(1,0) | f(F/2,0) | f(F/2,0) |
| f(0,B/2) | f(1,F/2) | f(B/2,F/2) | f(F/2,F/2) | f(0,B/2) | f(1,0) | f(B/2,0) | f(F/2,0) | f(0,0) |

Each operation is represented distinctively in connection with the presence/absence of a change or displacement (or shifting) of each of the scanning center position, the irradiation time (t) and the irradiation start point of a light beam which are determined at the first time of recording mark formation. The operation function follows the under-mentioned notation.

1) A processing for a portion upper than the scanning center line of a light beam and a processing for a portion lower than that are described by either one of subscripts 1, B/2, F/2, 0 on the left side in a parenthesis subsequent to f and on the right side in the parenthesis subsequent to f, respectively.

2) There are a total of five kinds of subscripts as follows:

w indicates an operation in which the irradiation time is the same or t, the irradiation start point is the same and a power having a recording action is applied;

1 indicates an operation in which the irradiation time is the same or t, the irradiation start point is the same and a power having an erasing action is applied;

B/2 indicates an operation in which the irradiation time is t/2, the irradiation start point is the same and a power having an erasing action is applied;

F/2 indicates an operation in which the irradiation time is t/2, the irradiation start point is shifted by t/2 in a beam travel direction and a power having an erasing action is applied; and 0 indicates a non-irradiation operation.

For example, f(1, B/2) represents an operation in which the upper half portion is subjected to erasion in the whole thereof and the lower half portion is subjected to erasion in a right half thereof. If a displacement or shifting is given to the scanning center of the light beam, the seventeen kinds of operation functions shown in Table 1 are the combination of the five kinds of operations indicated by the above-mentioned subscripts. Thus, the operations indicated by the subscripts will be termed elementary operations. The product of operation functions (or continuous operation) including the elementary operations and the combination thereof is shown by way of example. There are clearly shown at least five points as follows:

1) the elementary operation w cancels any elementary operation;

2) the elementary operations F/2 and B/2 at the same scanning center are equivalent to the elementary operation 1;

3) the elementary operation 1 cancels any one of the remaining elementary operations in which the scanning center is the same;

4) an interchangeability exists in the order of operation between the elementary operations F/2, B/2 and 0 at the same scanning center; and 5) an operation function group including the elementary operations or the combination thereof is closed.

Table 2 shows a change in recording mark form after the total of seventeen kinds of operations have been performed once for the sixteen kinds of recording mark forms shown in FIG. 1

TABLE 2

(EXAMPLES OF NOTATION)

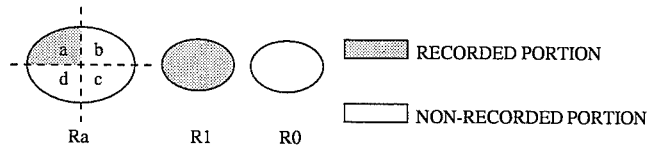

| FORM OF RECORDING MARK | OPERATION FUNCTION | | | | | | | |
|---|---|---|---|---|---|---|---|---|
| | F(1,1) | F(B/2,1) | f(F/2,1) | f(0,1) | f(1,B/2) | f(B/2,B/2) | f(F/2,B/2) | f(0,B/2) |
| R0   | R0 | R0 | R0 | R0 | R0  | R0   | R0  | R0   |
| Ra   | R0 | R0 | Ra | Ra | R0  | R0   | Ra  | Ra   |
| Rb   | R0 | R0 | Rb | R0 | Rb  | R0   | Rb  | R0   |
| Rc   | R0 | R0 | R0 | R0 | R0  | R0   | R0  | R0   |
| Rd   | R0 | R0 | R0 | R0 | Rd  | Rd   | Rd  | Rd   |
| Rab  | R0 | Rb | Ra | Rab | R0  | Rb   | Ra  | Rab  |
| Rac  | R0 | R0 | Ra | Ra | R0  | R0   | Ra  | Ra   |
| Rad  | R0 | R0 | Ra | Ra | Rd  | Rd   | Rad | Rad  |
| Rbc  | R0 | Rb | R0 | Rb | R0  | Rb   | R0  | Rb   |
| Rbd  | R0 | Rb | R0 | Rb | Rd  | Rbd  | Rd  | Rbd  |
| Rcd  | R0 | R0 | R0 | R0 | Rd  | Rd   | Rd  | Rd   |
| Rabc | R0 | Rb | Ra | Rab | R0  | Rb   | Ra  | Rab  |
| Rbcd | R0 | Rb | R0 | Rb | Rd  | Rbd  | Rd  | Rbd  |
| Racd | R0 | R0 | Ra | Ra | Rd  | Rd   | Rad | Rad  |
| Rabd | R0 | Rb | Ra | Rab | Rd  | Rbd  | Rad | Rabd |
| R1   | R0 | Rb | Ra | Rab | Rd  | Rbd  | Rad | Rabd |

| FORM OF RECORDING MARK | OPERATION FUNCTION | | | | | | | | |
|---|---|---|---|---|---|---|---|---|---|
| | f(1,F/2) | f(B/2,F/2) | f(F/2,F/2) | f(0,F/2) | f(1,0) | f(B/2,0) | f(F/2,0) | F(0,0) | Fw |
| R0   | R0 | R0  | R0  | R0   | R0  | R0   | R0  | R0   | R1 |
| Ra   | R0 | R0  | Ra  | Ra   | R0  | R0   | Ra  | Ra   | R1 |
| Rb   | R0 | Rb  | R0  | Rb   | R0  | Rb   | R0  | Rb   | R1 |
| Rc   | Rc | Rc  | Rc  | Rc   | Rc  | Rc   | Rc  | Rc   | R1 |
| Rd   | R0 | R0  | R0  | R0   | Rd  | Rd   | Rd  | Rd   | R1 |
| Rab  | R0 | Rb  | Ra  | Rab  | R0  | Rb   | Ra  | Rab  | R1 |
| Rac  | Rc | Rc  | Rac | Rac  | Rc  | Rc   | Rac | Rac  | R1 |
| Rad  | R0 | R0  | Ra  | Ra   | Rd  | Rd   | Rad | Rad  | R1 |
| Rbc  | Rc | Rbc | Rc  | Rbc  | Rc  | Rbc  | Rc  | Rbc  | R1 |
| Rbd  | R0 | Rb  | R0  | Rb   | Rd  | Rbd  | Rd  | Rbd  | R1 |
| Rcd  | Rc | Rc  | Rc  | Rc   | Rcd | Rcd  | Rcd | Rcd  | R1 |
| Rabc | Rc | Rbc | Rac | Rbc  | Rc  | Rbc  | Rac | Rabc | R1 |
| Rbcd | Rc | Rbc | Rc  | Rbc  | Rcd | Rbcd | Rcd | Rbcd | R1 |
| Racd | Rc | Rc  | Rac | Rac  | Rcd | Rcd  | Racd | Racd | R1 |
| Rabd | R0 | Rb  | Ra  | Rab  | Rd  | Rbd  | Rad | Rabd | R1 |
| R1   | Rc | Rbc | Rac | Rabc | Rcd | Rbcd | Racd | R1  | R1 |

R indicates the remaining portion after an operation function has been operated once. Subscripts a, b, c and d indicate places when a recording mark is equally divided into four parts in up/down and right/left directions. More especially, the left half of the upper portion is taken as a and the remaining parts are taken as b, c and d in the righthanded order. A subscript 1 indicates that all of a, b, c and d remain as recorded portions, and a subscript 0 indicates that all of a, b, c and d are non-recorded portions. It is apparent from Table 2 and FIG. 3 that a recording mark form group is closed with respect to all the operation functions. The actual rewriting of information is performed in such a manner that the combination of operation functions having the smallest number of times of operation is selected from Tables 1 and 2 and is operated.

Next, explanation will be made of an operating method when a non-recorded portion exists in a mark area to be subjected to recording.

When a non-recorded portion exists in the mark area to be subjected to recording, it is necessary to perform an operation of ensuring at least the mark area to be subjected to recording by means which makes irradiation with a power having a recording action. At this time, the light beam scanning center position, the irradiation time $t$ and the irradiation start point as mentioned above are set again. The subsequent operation follows a method for formation of a recording mark as explained in the above.

An object to be subjected to recording is an information recording material such as a phase change type recording medium or an optomagnetic medium in which high-speed change-over between recording and erasion is possible and perfect erasion in the light beam irradiated region is possible.

Next, the partial shaping, when the light beam irradiation scanning center is made the same and an erasing power causing no erasion in the whole of the irradiation is applied, will be mentioned in conjunction with an example which uses the dependency of the crystal growth rate of a phase change type optical recording medium on the irradiation power of a light beam.

First, explanation will be made of the kind of form of a recording mark.

The present embodiment will be explained by use of FIG. 2.

In the phase change type optical recording medium used in the present experiment, a recorded portion is amorphous and a non-recorded portion is crystalline.

For example, a ternary compound InSbTe medium exhibits an erasion process depending on amorphous/crystal interface growth but the medium exhibiting a crystal growth process is characterized in that the crystal of a non-recorded portion after initialization and a crystal after erasion are the same, the interface is extremely clear and a crystal growth start point is limited on the interface. As the result of DC irradiation of an existing recording mark with a power in a range leading to no perfect erasion were obtained three kinds of different recording marks which have forms (3) to (5) as shown in FIG. 2. In the prior art, information is represented by two kinds of recording or form (1) and erasion or form (2). According to the result of the present experiment, it was confirmed that at least five kinds of recording marks can be formed by shaping the form of the interface in such a manner that an irradiation power set to a low value lacking an erasing power is applied with the light beam scanning center being not shifted.

Next, explanation will be made in connection with the dependency of the crystal growth rate on the irradiation power.

It is known that the crystal interface growth rate of the ternary compound InSbTe medium having a defined structure exemplified in the above embodiment has the maximum value. Recording marks of such as the forms (3) to (5) shown in FIG. 2 can be formed in accordance with a position in the vertical direction of a track at which the crystal interface growth rate takes the maximum value or in contrast with this by controlling an irradiation power to allot the position of the maximum crystal growth rate to a desired position.

Next, explanation will be made of the operation function and an object thereof.

Since the irradiation power exhibiting an erasing action differs for each recording mark form shaping operation, there is no interchangeability in operation between generated operation functions. The object is an information recording material such as a phase change type recording medium or an optomagnetic medium in which high-speed recording/erasion is possible, the start point of an erasing operation exists at only an interface between a recorded portion and an erased portion, and the interface growth rate can be controlled by the irradiation power of a light beam.

In one method, the light beam irradiation scanning center is arbitrarily moved and an erasing power causing no erasion in the whole of an irradiated region is applied. In this case, since that position of an interface in the light beam irradiated region which is in a crystal growth temperature range is determined in accordance with the irradiation power, the form shaping becomes possible.

In another method, the light beam irradiation scanning center is arbitrarily moved and an erasing power causing no erasion in the whole of an irradiated region is applied as in the above method or an erasing power causing perfect erasion in an irradiated region is applied. In this case too, since that position of an interface in the light beam irradiated region which is in a crystal growth temperature range is determined in accordance with the irradiation power, the generation of a form becomes possible.

The basic recording mark forms shown in FIG. 2 can be obtained in the above-mentioned manner. In the present experiment were used the phase change type recording medium of ternary compound InSbTe, the optical head opening ratio or numerical aperture of 0.55, the converged beam diameter of 1.2 μm and the waveform of 830 nm. A recording mark were formed with a power of 14 mW higher than a usual recording power, and irradiation with DC light of 6 mW to 7.5 mW lower than an erasing power was thereafter made. As a result, a change in amorphous/crystal interface form of the recording mark shown in FIG. 2 was obtained. The form of the recording mark is controlled by virtue of the fact that as the applied irradiation power is increased, a temperature range providing the maximum crystallization rate is shifted farther apart from the center of an information track in a direction perpendicular to the track and the fact that only the amorphous/crystal interface existing in the beam irradiation diameter is movable at a speed corresponding to the irradiation power. The present example is an example in which a displacement is not given to variables of the form shaping operation function or the scanning position, the irradiation time and the irradiation start point of a light beam and a displacement or change is given to the irradiation power by use of means for momently setting a power having an erasing action. If a displacement is given to at least one of the scanning position, the irradiation time and the irradiation start point of a light beam, the number of kinds of recording mark forms representing information is further increased. On the other hand, it is also suggested that a more complicated form shaping becomes possible through the combined use of the present recording method. It should be noted that in the case where the erasing power is changed at the same light beam scanning center when the operation function is operated, an interchangeability in order of operation is lost.

Figure 3A:
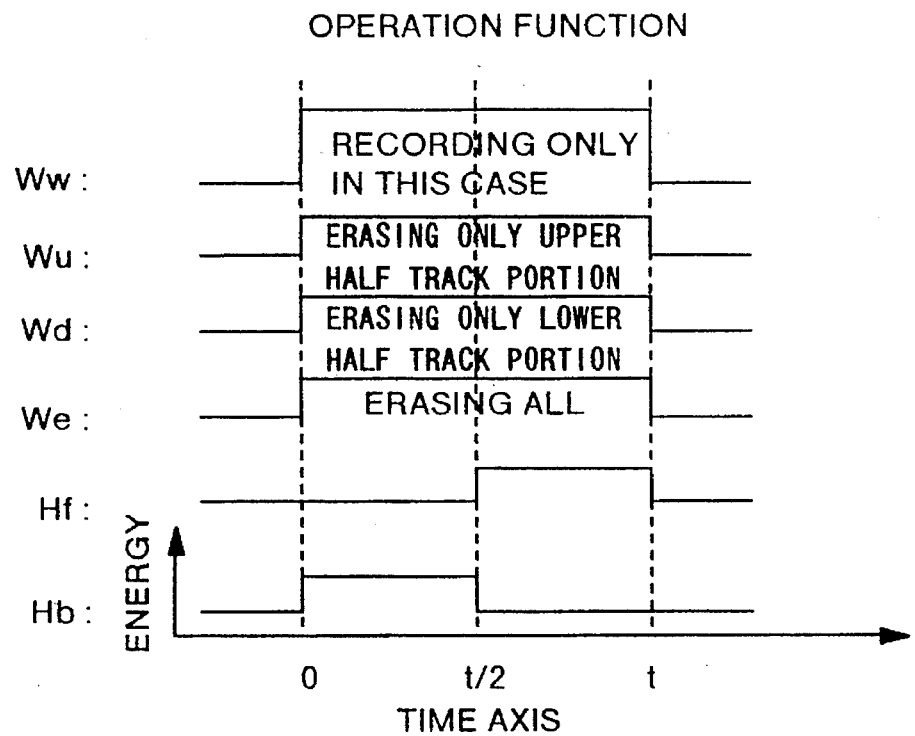
FIGS. 3A and 3B are diagrams showing a relationship between six kinds of operation functions and recording mark forms.
Figure 3B:
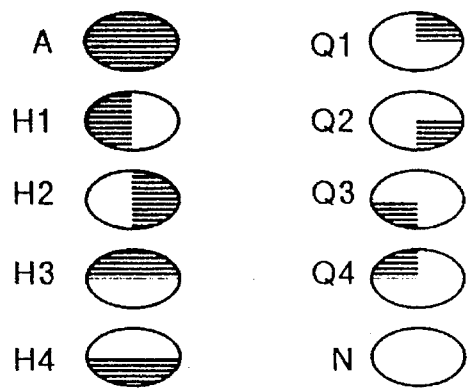

Table 3 and FIGS. 3A and 3B show one example of a recording system according to the present invention.

TABLE 3

| AFTER OVERWRITE | EXISTING RECORDING MARK | | | | | | | | | |
|---|---|---|---|---|---|---|---|---|---|---|
| | A | H1 | H2 | H3 | H4 | Q1 | Q2 | Q3 | Q4 | N |
| A | φ | | | | | Ww | | | | |
| H1 | Hf | φ | | | | | Ww*Hf | | | |
| H2 | Hb | Ww*Hb | φ | | | | | Ww*Hb | | |
| H3 | Wd | | Ww*Wd | φ | | | | | Ww*Wd | |
| H4 | Wu | | Ww*Wu | | φ | | | | | Ww*Wu |

TABLE 3-continued

| AFTER OVERWRITE | EXISTING RECORDING MARK | | | | | | | | | |
|---|---|---|---|---|---|---|---|---|---|---|
| | A | H1 | H2 | H3 | H4 | Q1 | Q2 | Q3 | Q4 | N |
| Q1 | Wd*Hb | Ww*Wd | Wd | Hb | Ww*Wd*Hb | φ | | Ww*Wd*Hb | | |
| Q2 | Wu*Hb | Ww*Wu | Wu | Ww*Wu*Hb | Hb | Ww*Wu*Hb | φ | | Ww*Wu*Hb | |
| Q3 | Wu*Hf | Wu | Ww*Wu*Hf | | Hf | Ww*Wu*Hf | | φ | | Ww*Wu*Hf |
| Q4 | Wd*Hf | Wd | Ww*Wd*Hf | Hf | | Ww*Wd*Hf | | Ww*Wd*Hf | φ | Ww*Wd*Hf |
| N | | | | | We | | | | | φ |

φ: INDICATE NON-IRRADIATION

Ten kinds of mark forms A to N are formed using six kinds of operation functions (Ww, Wu, Wd, We, Hf and Hb) shown in FIG. 3A. Table 3 is a table showing operation functions for completing the ten kinds of mark forms A to N with the smallest number of times of one-beam overwrite and most rapidly in the case where a recording mark (see FIG. 3B) is equally divided into four parts in the up/down and right/left directions. The six kinds of operation functions includes a recording operation (Ww) as a basic operation for forming a recording mark and five kinds of operations when an irradiation power having an erasing action is used, that is,

- an operation (We) in which each of the light beam scanning center position, the irradiation time (t) and the irradiation start point is the same,
- an operation (Wu) in which the light beam scanning center position is shifted to the upper portion and each of the irradiation time (t) and the irradiation start point is the same,
- an operation (Wd) in which the light beam scanning center position is shifted to the lower portion and each of the irradiation time (t) and the irradiation start point is the same,
- an operation (Hf) in which the light beam scanning center position is the same, the irradiation time is t/2 and the irradiation start point is shifted by t/2 in the direction of progression of light beam scanning, and
- an operation (Hb) in which the light beam scanning center position is the same, the irradiation time is t/2 and the irradiation start point is the same.

For example, when the rewriting from the existing recording mark H4 to Q1 after overwrite is desired, the operation function table or Table 3 provides Ww*Wd*Hb:H4=Q1. In the formation of a partially divided recording mark, (1) in the case where a recording portion after overwrite includes a part which does not overlap the existing recording portion, it is necessary to first form a recording portion corresponding to one-bit information (Ww), and (2) a pulse erasing operation is needed in association with the case (a) where an off-track amount is divided with the same irradiation time (Wu, Wd) and the case (b) where the irradiation time is divided with the same off-track amount (Hf, Hb).

In the case of the present example, one-beam overwrite is possible between the ten kinds of any mark forms through the number of times of operation which is 3 at the greatest, taking the operation (2) inclusive of one time at the greatest for the case (a) and one time at the greatest for the case (b) and the operation (1) into consideration. For example, in contrast to the conventional case where information of the N-th power of 2 is recorded/reproduced in 33 ms/track, this system makes it possible to record/reproduce information of the N-th power of 10 in 99 ms/track even in the latest case. Also, though eight bits for one byte are required in the conventional system, three bits suffice in the present system.

FIG. 4 shows an example of the operation of a system for performing the recording/reproduction of information represented by use of recording marks of plural or more different forms according to the present invention. 1) The original signal (02) is read to produce a difference between the read signal and a rewrite signal (01). 2) The number of times of irradiation of a laser beam is considered. 3) An erasing pulse pattern (W, H, WH) for making irradiation is considered. Thereafter, the irradiation is executed, thereby completing the rewriting. As a safe measure for reduction of miswriting, the operation (We) of perfect erasion is performed at every certain number of times of rewriting or when a noise level caused by the deterioration of the form of a recording mark increases beyond a certain threshold value. The mere periodic addition of one time of this operation to the smallest number of times of processing operation suffices for completion.

Figure 5:
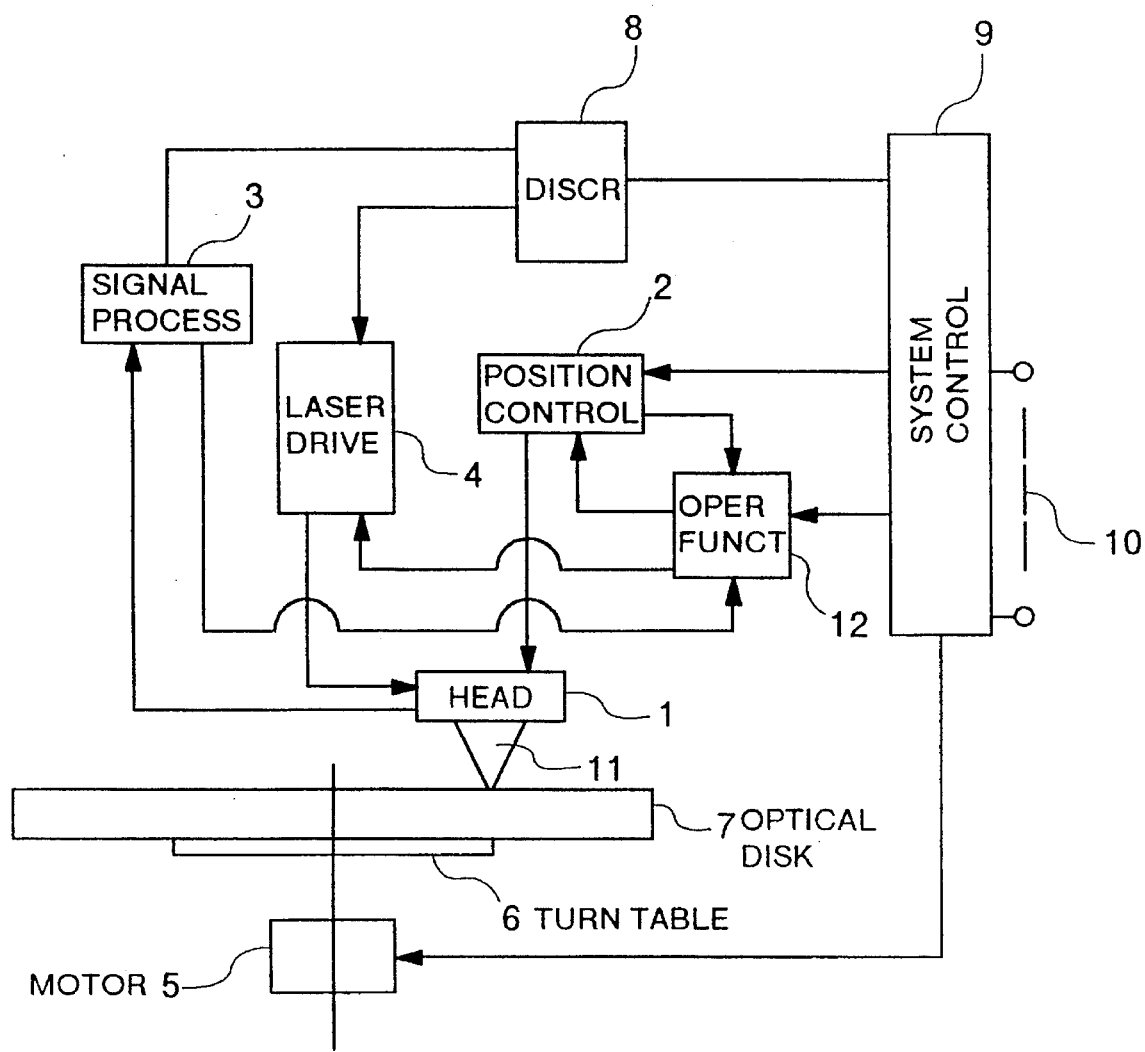
FIG. 5 is a diagram showing the schematic construction of an optical disk apparatus of the present invention.

FIG. 5 shows an optical recording/reproducing system in which the present invention is used.

An optical pickup (or optical head) 1 performs the transfer of optical information. Reference numeral 2 denotes a position control circuit for controlling the position of the optical pickup, numeral 3 a signal processing circuit for processing a received signal, numeral 4 a laser driver for making at least the setting of an irradiation power or an irradiation ON/OFF control, numeral 5 a driving motor (or spindle motor) for rotating an optical recording medium or optical disk, numeral 6 a turn table, numeral 7 the optical disk, numeral 9 a system control circuit, numeral 10 a group of external input terminals, numeral 11 a laser beam, and numeral 12 a circuit for generating and controlling an operation function for recording or rewriting. As an additional component may be added, for example, a discriminating circuit 8 for discriminating the melting points of optical recording and magnetic recording layers in order to enable the more facilitated setting of a laser irradiation power when the medium is exchanged.

The optical disk 7 is placed on the turn table 6. The turn table 6 is rotated by the spindle motor 5 to rotate the optical disk 7. The stoppage of the rotation operation is made through the system control circuit 9 by the external input terminal 10.

The optical disk 7 is irradiated with the laser beam 11 by the optical head 1. A reflected version of the laser beam 11 returns to the optical head 1. An output of the optical head 1 is received by the signal processing circuit 3 which in turn extracts signals representing the height of the optical head 1 and a deviation on the track. These signals are used for controlling the optical head 1 through the optical head position control circuit 2 so that focusing and tracking are obtained for the optical disk. The stoppage of the focusing and tracking operation is made through the system control circuit 9 by the external input terminal 10.

The optical head 1 is such that the setting to any laser power can momently be made through the laser driver 4 by the system control circuit 9 and one-beam overwrite is possible.

The overwriting in a control track provided on the inner or outer circumference of the optical disk 7 is also possible at the melting point of the optical recording medium or a temperature higher than that.

When the overwriting for the optical disk 7 is made in a recording operation, the operation function generating and controlling circuit 12 performs a function of generating and controlling an operation function having at least a beam scanning position, an irradiation time, an irradiation start point and an irradiation power as variables which is determined from a beam scanning position detected by the optical head position control circuit 2 and a difference between the kind of the form of an existing recording portion detected by the signal processing circuit 3 and the kind of the form of a recording portion after overwriting transmitted through the system control circuit 9 from the external input terminal 10. The operation function generating and controlling circuit 12 feeds the result back to the optical head position control circuit 2 and the laser driver 4.

The recording density of the recording/reproducing system is improved by representing by use of the recording marks having plural or more different forms and recording/reproducing such information.

Next, an embodiment of a method of generating a clock signal will be explained using FIG. 6.

An optical disk apparatus in the present embodiment uses a phase change type medium as an optical disk (or information recording medium) 7. The optical disk 7 is supported by a supporting member 601 which corresponds to the turn table 6 shown in FIG. 5. A spindle motor 5 is connected to the supporting member 601 to rotationally drive the optical disk 7 at a speed of 3600 revolutions per second. A rotation speed controller 103 is connected to the spindle motor 5 to control the rotation speed of the spindle motor 5.

The optical disk 7 has the radius of 2.5 inches and a recording/reproduction area of 30 to 60 mm$\phi$. The optical disk 7 has a spiral recording/reproduction track and is preformatted into a CAV (Constant Angular Velocity) system in which servo marks are provided on the recording/reproduction track (radially with respect to the center of the optical disk 7) with 688 servo marks per one circumference or turn of the track. The track interval is 1.5 μm.

An optical head 1 for making the recording/reproduction for the optical disk 7 is arranged on the lower surface side of the optical disk 7. The optical head 1 is composed of a semiconductor laser source having the wavelength of 780 nm, an optical system including an objective lens with the numerical aperture of 0.55 for focusing a laser beam onto the optical disk, a photo detector for detecting the amount of light reflected from the optical disk by the irradiation thereof with the laser beam, a tracking actuator for driving the objective lens in the direction of radius of the optical disk 7 in order that the irradiation position of the laser beam follows the track, a focus actuator for driving the objective lens in the direction of optical axis of the laser beam in order that the focus position of the laser beam follows the surface of the optical disk, and so forth. A coarse actuator 112 is attached to the optical head 1 for moving the same in the direction of radius of the optical disk 7.

A preamplifier 120 and a laser driver 4 are connected to the optical head 1.

To the preamplifier 120 are successively connected a clock pit detecting circuit 121 for extracting a reproduction signal waveform corresponding to a clock pit formed in servo marks on the optical disk 7, a PLL (Phase Locked Loop) 122 for generating a reference clock signal 123 of 2 MHz on the basis of the timing of the clock pit, and a variable delay circuit 124 for delaying the reference clock signal 123 by a set time. On the other hand, the preamplifier 120 are connected to a discriminator 125, a demodulator 126, an error corrector 129 and a delay amount demodulator 132. The discriminator 125 discriminates an output of the preamplifier 120 at the timing of discrimination according to a reproduction clock signal 211 outputted from the variable delay circuit 124 to output a train 325 of detection signals. The demodulator 126 reproduces information in a user data region (or user data) from the detection signal train 325 and the reproduction clock signal 211. The error corrector 129 corrects an error of the user data demodulated by the demodulator 126. The delay amount demodulator 132 demodulates a delay setting value from the detection signal train 325 outputted by the discriminator 125 and the reproduction clock signal 211.

The laser driver 4 is connected to a modulator 127 for generating a recording command signal 219 for user data and a delay amount modulator 133 for generating a recording command signal 219 for a delay amount recording mark 501.

A controller 134 is connected to the variable delay circuit 124, the error corrector 129, the delay amount demodulator 132 and the delay amount modulator 133. The controller 134 includes an I/F (interface) control section 139, a file managing section 131, a random number generating section 135, a delay amount managing section 136, a delay amount setting section 137 and a mechanical system control section 138. Each of these sections is provided with a memory having a program stored therein and an operator (not shown) for reading and operating the program and performs a function as will be mentioned later on. The I/F (interface) control section 139 controls an interface in inputting and outputting user data from and to a host computer connected to the controller 134. The file managing section 131 receives user data from the host computer through the I/F (interface) control section 139 at the time of recording to output the same to the error corrector 129 and receives user data from the error corrector 129 at the time of reproduction to transfer the same to the host computer through the I/F (interface) control section 139. The random number generating section 135 generates a random number used for defining a delay amount 217. The delay amount managing section 136 determines the delay amount 217 which is a timing for recording of user data. The delay amount setting section 137 sets the delay amount 217 to the variable delay circuit 124. The mechanical system control section 138 controls the mechanical operations of the optical head 1, the coarse actuator 112 and the spindle motor 5. The controller 134 further includes a control section 602 for giving an instruction for operation to each of the I/F (interface) control section 139, the file managing section 131, the random number generating section 135, the delay amount managing section 136, the delay amount setting section 137 and the mechanical system control section 138. The control section 602 has a memory (not shown) having a program stored therein and an operation section (not shown) for reading and operating the program. When receiving the instructions for the recording, reproduction and erasion of user data for the optical disk 7 from the host computer, the control section 602 successively gives the instructions of operations to the above-mentioned sections to perform the recording, reproduction and erasion.

The operation of the optical disk apparatus of the present embodiment will now be explained.

First, the operation when user data is recorded by use of the optical disk apparatus of the present invention will be explained using FIGS. 6, 7, 9, 10, 11 and 12.

Figure 7:
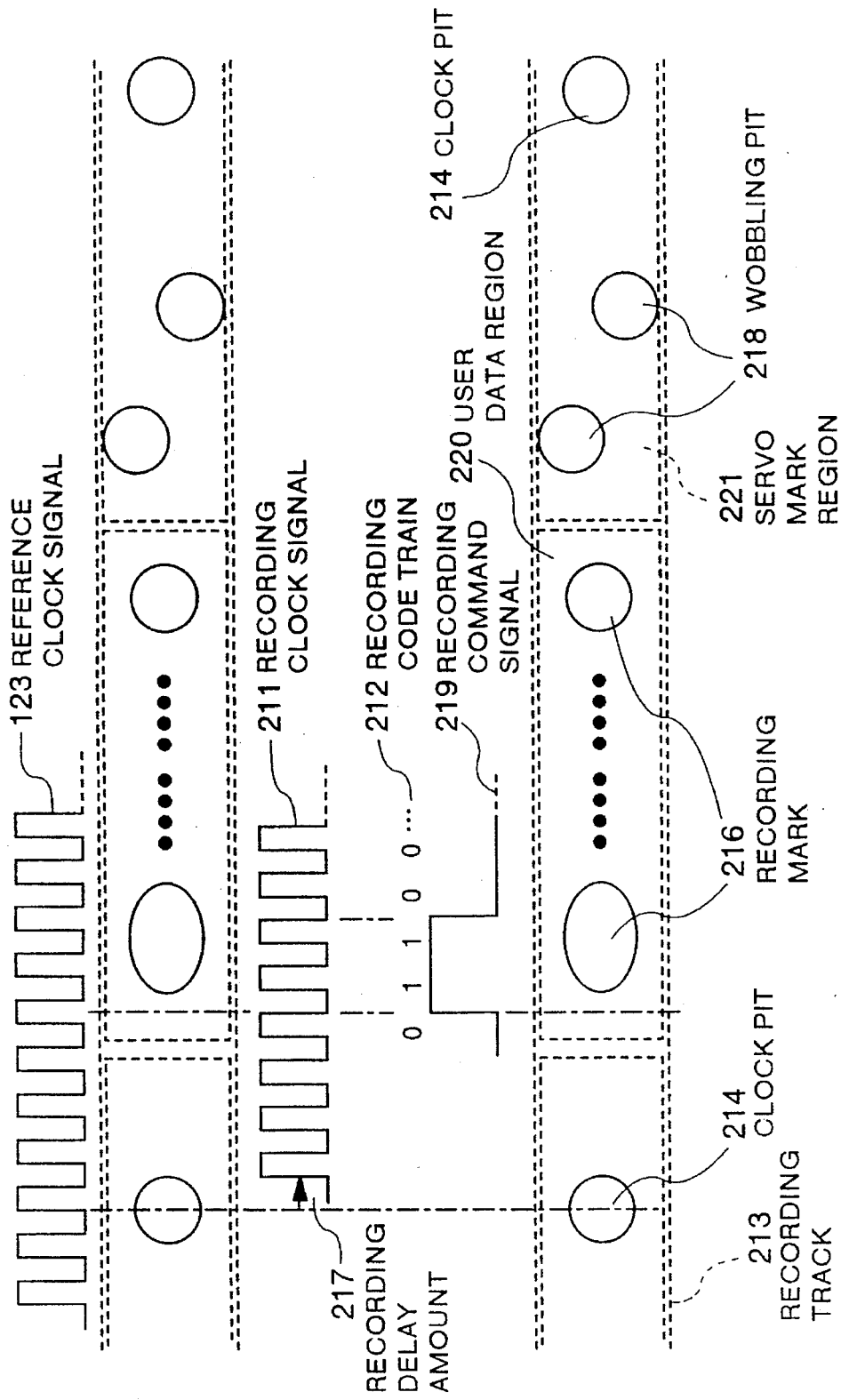
FIG. 7 is an explanatory chart showing a recording mark recorded on an optical disk shown in FIG. 6 and a delayed recording clock signal.
Figure 8:
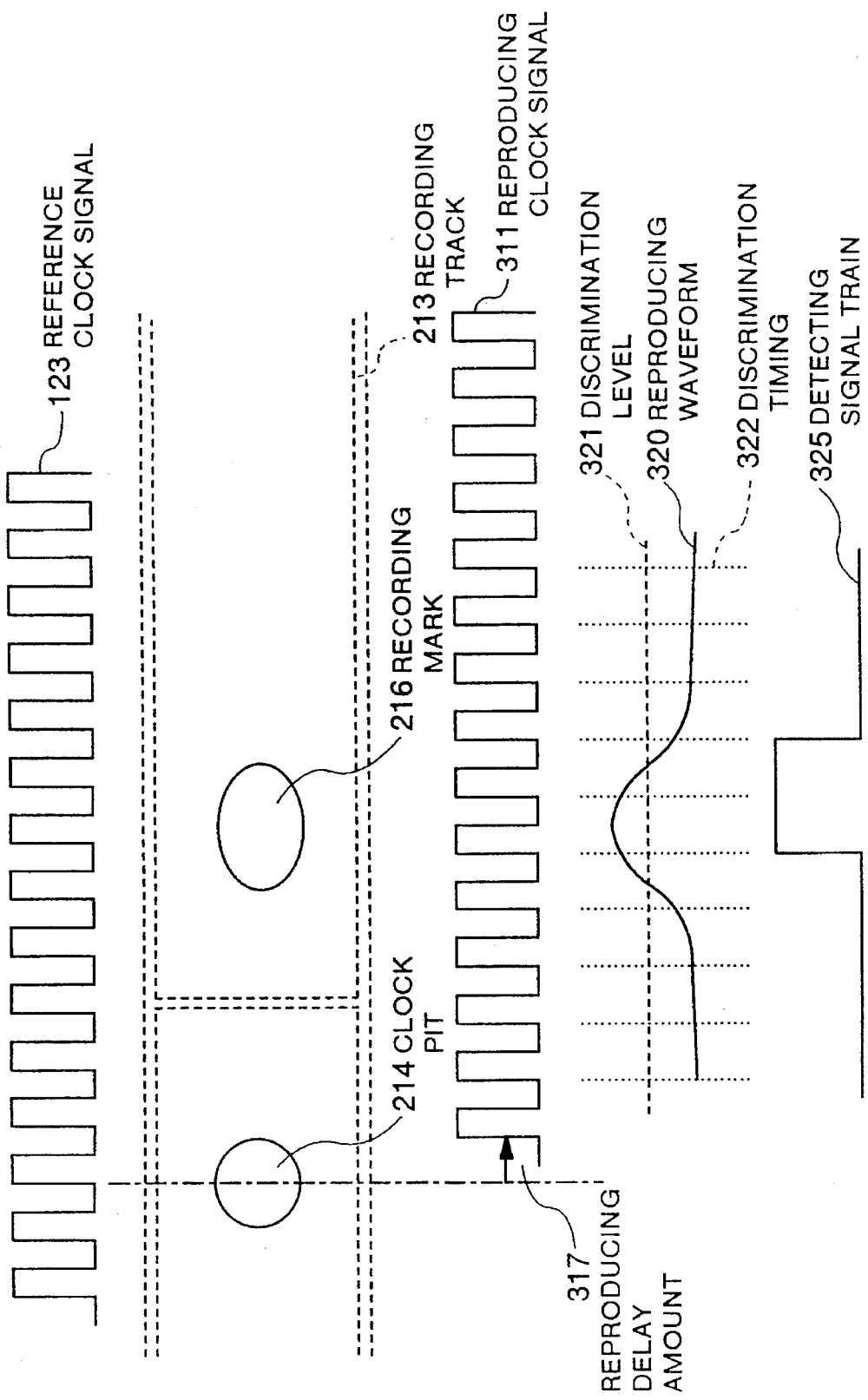
FIG. 8 is an explanatory chart showing a recording mark recorded on the optical disk shown in FIG. 6 and a delayed reproduction clock signal.
Figure 9:
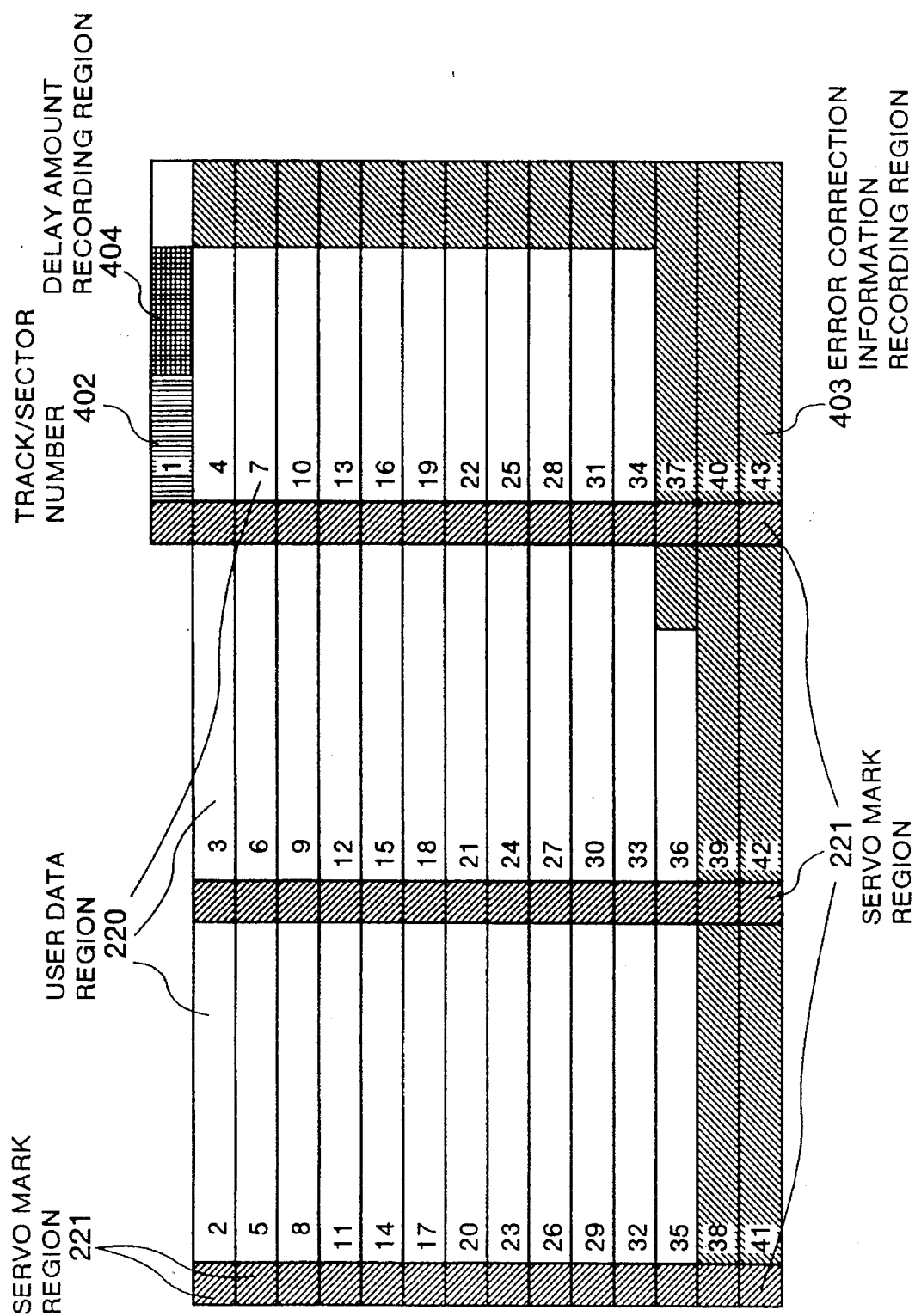
FIG. 9 is a diagram showing the position of a delay amount recording region in one sector of the optical disk shown in FIG. 6.

As shown in FIGS. 7 and 9, a servo mark region 221 and a user data region 220 alternately exist on a recording track 213 of the optical disk 7. A clock pit 214 used for the generation of a reference clock signal 123 and wobbling pits 218 used for having a focus position of a laser beam of the optical head 1 follow the center of the recording track 213 are beforehand formed (or preformatted) in the servo mark region 221. In the present embodiment, a recording mark 216 recorded in the user data region 220 is formed with the shift of 45 ns at the greatest and hence it is necessary to make the user data region 220 larger than that in the usual case by 45 ns. In the present embodiment, therefore, the servo mark region 221 is reduced by 45 ns so that the blank portion of the servo mark region having been not subjected to the recording of user data in the conventional apparatus can be utilized as the user data region 220.

Figure 12:
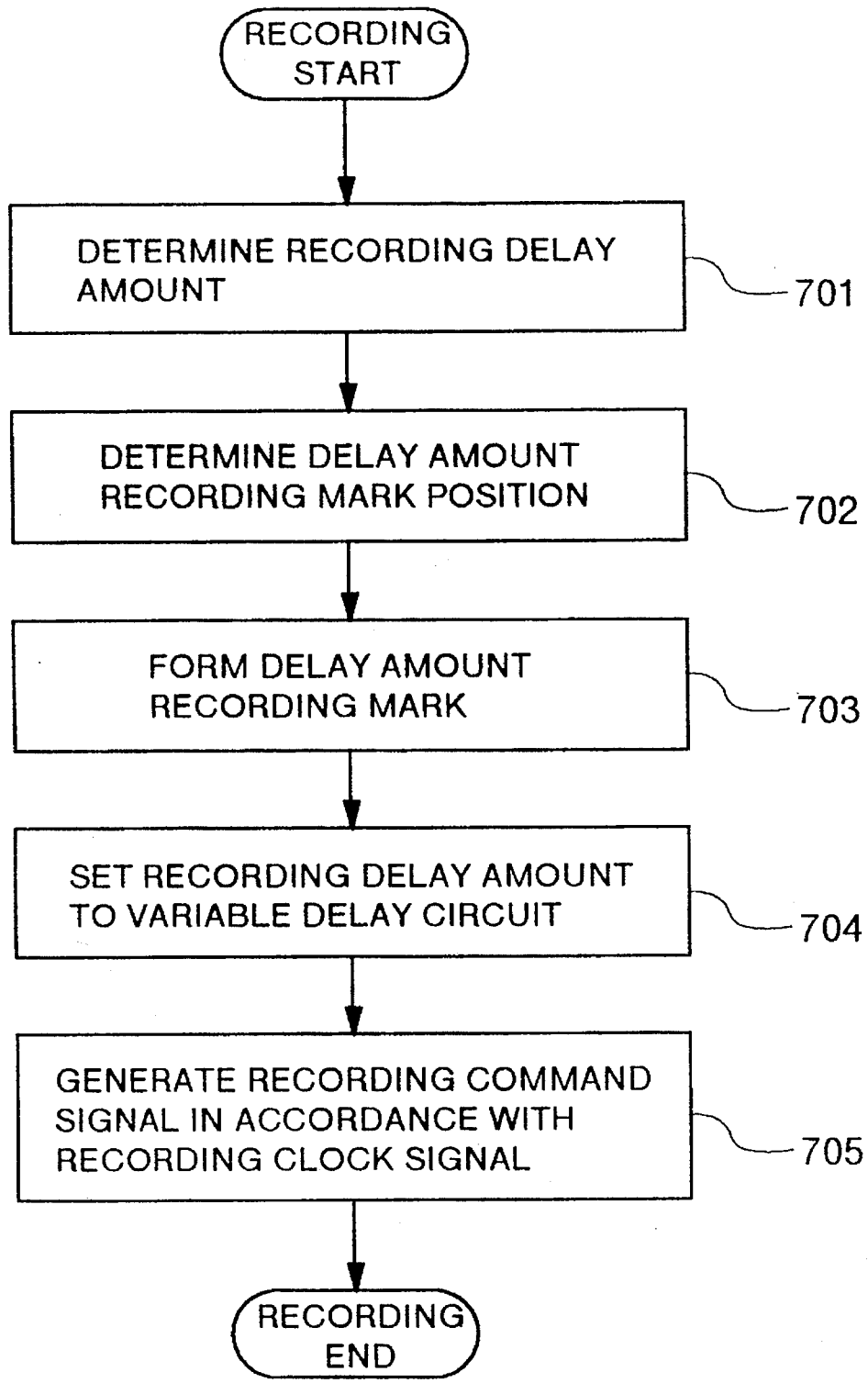
FIG. 12 is a chart showing the operation of the optical disk apparatus shown in FIG. 6 in the case where the recording to the optical disk is made.

The control section 602 of the controller 134 includes a memory in which a program for recording as shown by a flow chart of FIG. 12 is stored. In accordance with this program, the control section 602 operates the other control sections in the controller 134 so that user data is recorded at a position shifted from the preceding recording mark 216 of user data.

First, the control section 602 gives the instruction of operation to the mechanical system control section 138. The mechanical system control section 138 instructs the optical head 1 to perform the operation for reproduction of the servo mark region 221. The amount of light reflected from the optical disk 7 is converted by the photo detector in the optical head 1 into an electric signal which is in turn amplified by the preamplifier 120. The clock pit detector 121 extracts a reproduction signal waveform corresponding to a clock pit 214 formed in the servo mark region 221 on the optical disk medium, and the PLL 122 divides the timing of the clock pit to generate a reference clock signal 123 of 11.2 MHz.

Next, the control section 602 gives the instructions of operations to the random number generating section 135 and the delay amount managing section 136. The random number generating section 135 generates any one of numbers of 0 to 9 in a disordered manner to output this number as a delay setting value to the delay amount managing section 136. The delay amount managing section 136 outputs the delay setting value to the delay amount modulator 133 (step 701).

Further, the control section 602 gives the instructions of operation and delay amount=0 to the delay amount setting section 137. The delay amount setting section 137 sets delay amount=0 to the variable delay circuit 124. Thereby, the variable delay circuit 124 outputs the reference clock signal 123 as it is.

The delay amount modulator 133 includes a table representing a relationship between delay setting values and delay amount recording data 1001 shown in FIG. 11. The delay amount modulator 133 generates delay amount recording data 1001 corresponding to the delay setting value received from the delay amount managing section 136 and generates a recording command signal 219 representative of the delay amount recording data 1001 from the delay amount recording data 1001 with the delay amount recording data 1001 being synchronized with the reference clock signal 123 (step 702). The generated recording command 219 is outputted to the laser driver 4.

Figure 10:
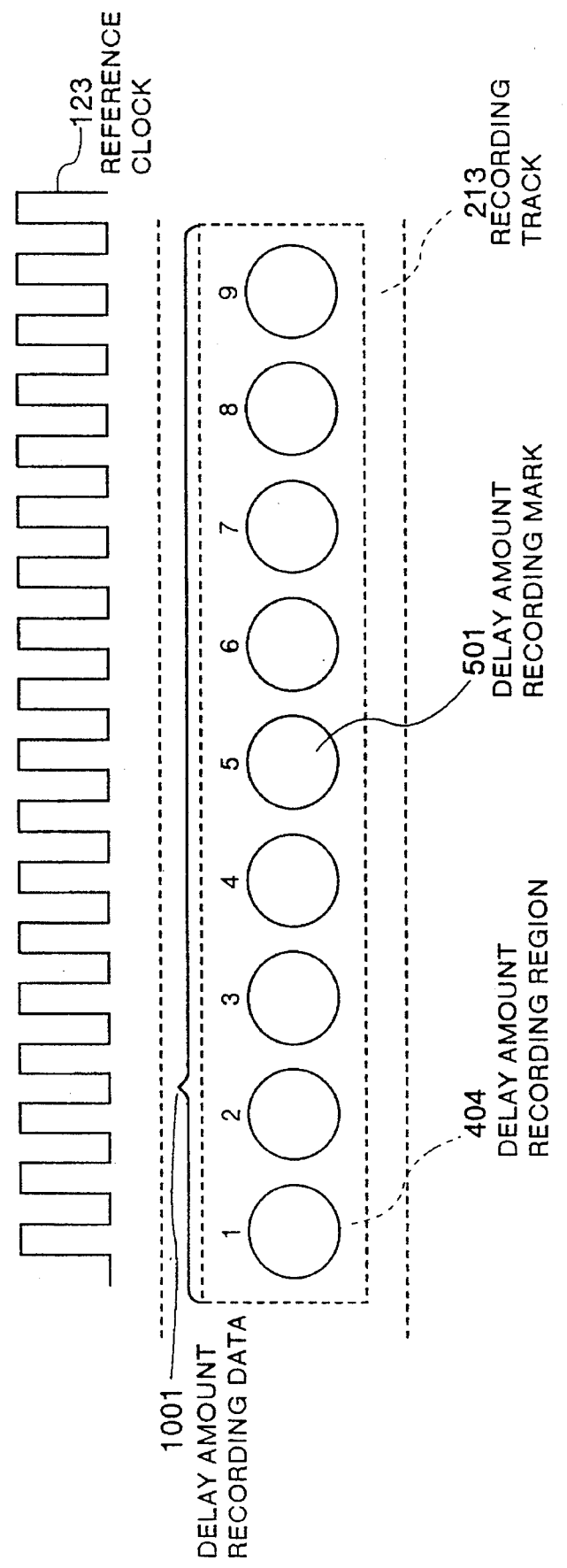
FIG. 10 is a diagram showing a recording mark of delay amount recording data recorded in the delay amount recording region shown in FIG. 9.

The laser driver 4 controls the output of the semiconductor laser in the optical head 1 on the basis of the recording command signal 219 for recording of a delay amount recording mark 501. Also, the control section 602 causes the mechanical system control section 138 to control the position of the optical head 1 and the rotation of the optical disk 7. Thereby, a delay amount recording mark 501 as shown in FIG. 10 is formed in a delay amount recording region 404 of the optical disk 7 shown in FIG. 9 (step 703).

Next, the control section 602 gives the instructions of operations to the delay amount managing section 136 and the delay amount setting section 137. The delay amount managing section 136 includes a table representing a relationship between delay setting values and delay amounts shown in FIG. 11 and generates a delay amount corresponding to a delay setting value received from the random number generating section 135. The generated delay amount is outputted to the delay amount setting section 137. The delay amount setting section 137 sets the delay amount 217 to the variable delay circuit 124 (step 704).

The variable delay circuit 124 delays the reference clock signal 123 by the set delay amount 217 to output the delayed signal as a recording clock signal 211 to the modulator 127. The control section 602 gives the instruction of operation to the file managing section 131. The file managing section 131 outputs user data to the error corrector 129. The error corrector 129 adds information for error correction to the user data and outputs it as a recording code train 212 to the modulator 127 after parallel/serial conversion. The modulator 127 synchronizes the recording code train 212 with the recording clock signal 211 to generate a recording command signal 219 for user data which is in turn outputted to the laser driver 4 (step 705). Thus, the recording command signal 219 synchronous with the recording clock signal 211 delayed from the reference clock signal by the delay amount 217 is generated.

The laser driver 4 controls the output of the semiconductor laser in the optical head 1 on the basis of the recording command signal 219 for user data. Also, the control section 602 causes the mechanical system control section 138 to control the position of the optical head 1 and the rotation of the optical disk 7. Thereby, a recording mark 216 as shown in FIG. 7 is formed in the user data region 220 of the optical disk 7 shown in FIG. 9.

Next, the operation when user data is reproduced by use of the optical disk apparatus of the present invention will be explained using FIGS. 6, 8, 9, 10, 11 and 13.

Figure 13:
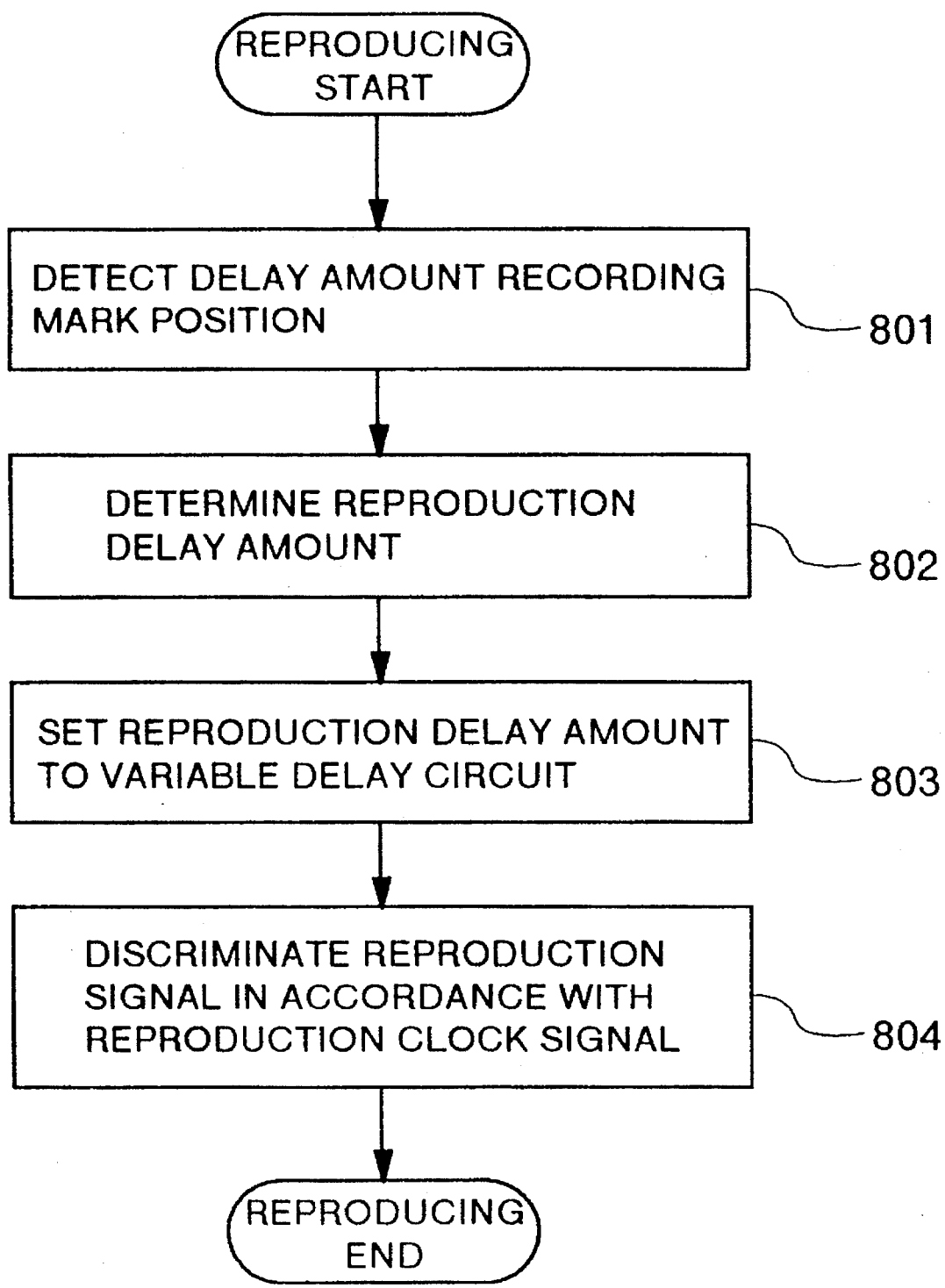
FIG. 13 is a chart showing the operation of the optical disk apparatus shown in FIG. 6 in the case where the reproduction from the optical disk is made.

The control section 602 of the controller 134 includes a memory in which a program for reproduction as shown by a flow chart of FIG. 13 is stored. In accordance with this program, the control section 602 operates the other control sections in the controller 134 so that a recording mark 216 representing user data recorded at a position shifted from the reference clock signal as mentioned above is reproduced.

First, the control section 602 gives the instruction of operation to the mechanical system control section 138. The mechanical system control section 138 operates the optical head 1, the spindle motor 5 and the coarse actuator so that the optical head 1 reproduces a mark in a servo mark region. The amount of light reflected from the optical disk 7 is converted by the photo detector in the optical head 1 into an electric signal which is in turn amplified by the preamplifier 120. The clock pit detector 121 extracts a reproduction signal waveform corresponding to a clock pit 214 formed in the servo mark region 221 on the optical disk medium, and the PLL 122 divides the timing of the clock pit to generate a reference clock signal 123 of 11.2 MHz.

Next, the control section 602 gives the instructions of operation and delay amount=0 to the delay amount setting section 137. The delay amount setting section 137 sets delay amount=0 to the variable delay circuit 124. Thereby, the variable delay circuit 124 outputs the reference clock signal 123 as a reproduction clock signal 311 to the discriminator 125 as it is.

The control section 602 gives the instruction of operation to the mechanical system control section 138. The mechanical system control section 138 operates the optical head 1, the spindle motor 5 and the coarse actuator 112 so that the optical head 1 detects a delay amount recording mark 216 in a delay amount recording region 404 (step 601).

The amount of light reflected from the optical disk 7 is converted by the photo detector in the optical head 1 into an electric signal which is in turn amplified by the preamplifier 120 and is then outputted to the discriminator 125. The discriminator 125 compares a reproduction signal representative of delay amount recording data 1001 in the delay amount recording region 404 with a discrimination level 321 at a discrimination timing 322 corresponding to the reproduction clock signal 311 which remains as the reference clock signal 123. In accordance with the result of comparison, a detection signal train 325 representing the delay amount recording data 1001 is outputted from the discriminator 125 to the delay amount demodulator 132.

The delay amount demodulator 132 includes a table representing a relationship between delay setting values and delay amount recording data 1001 shown in FIG. 11. The delay amount demodulator 132 determines a delay setting value corresponding to the detection signal train 325 representative of the delay amount recording data 1001 and outputs it to the delay amount managing section 136.

The control section 602 gives the instructions of operations to the delay amount managing section 136 and the delay amount setting section 137. As has already been mentioned, the delay amount managing section 136 includes the table representing a relationship between delay setting values and delay amounts shown in FIG. 11. The delay amount managing section 136 determines a delay amount corresponding to the delay setting value received from delay amount demodulator 132 and outputs it to the delay amount setting section 137 (step 802). The delay amount setting section 137 sets the delay amount received from the delay amount managing section 136 to the variable delay circuit 124 as a reproduction delay amount 317 (step 803). The variable delay circuit 124 delays the reference clock signal 123 by the reproduction delay amount 317 to generate a reproduction clock signal 311 and outputs the reproduction clock signal 311 to the discriminator 311 and the demodulator 126.

The control section 602 gives the instruction of operation to the mechanical system control section 138. The mechanical system control section 138 operates the optical head 1, the spindle motor 5 and the coarse actuator so that the optical head 1 reproduces marks 216 in a user data region 221 and an error correction information recording region 403. The amount of light reflected from the optical disk 7 is converted by the photo detector in the optical head 1 into an electric signal which is in turn amplified by the preamplifier 120 and is then outputted to the discriminator 125.

The discriminator 125 discriminates a reproduction signal of the user data region 221 and the error correction information recording region 403 at the discrimination timing 322 corresponding to the reproduction clock signal 311 and outputs a detection signal train 325 representing user data and error correction information (step 804). The demodulator 126 demodulates the detection signal train 325 into a data bit train representative of user data and outputs it to the error corrector 129. The error corrector 129 makes error correction and outputs the error corrected data train to the file managing section 131 as a 512-byte data train. This data train is transferred to the host computer by the I/F control section 139.

In the optical disk apparatus of the present embodiment, in the case where data recorded on the optical disk 7 is to be erased, the user data region 220, the delay amount recording region 404 and the error correction information recording region 403 are irradiated with a laser beam from the optical head 1 to cause a phase change, thereby erasing marks formed in these regions. Since this erasing operation is the same as that of an optical disk apparatus provided with a known phase change type optical disk medium, the detailed explanation thereof will be omitted.

In the present embodiment, a recording mark is recorded with a shift in the user data region 220, as mentioned above. Therefore, even in the case where the same data as that at the preceding time is recorded, the deterioration of the crystalline of the optical disk can be prevented since the position of formation of a recording mark on the recording medium differs. Accordingly, in the optical disk apparatus of the present embodiment, the deterioration of the sensitivity of reproduction caused by the deterioration of the crystalline of the optical disk can be suppressed even if the recording/reproduction of user data is repeatedly performed in many times. Thereby, it is possible to obtain an optical disk apparatus which has a longer lifetime and a higher reliability.

In the present embodiment, a delay amount is recorded in the delay amount recording region. Therefore, the reproduction of data in the delay amount recording region at the time of reproduction makes it possible to detect the amount of delay of user data and to generate a delayed clock signal to be used for the discrimination of user data. Accordingly, since user data recorded with a delay can be reproduced using the delayed clock signal, the reproduction of user data can be realized.

In the above embodiment, the repeated recording of a recording mark at the same location is prevented by setting one from among nine steps of delay amounts by use of random numbers in order to define a delay amount. However, in order to more surely avoid the repeated recording at the same location and with the same delay amount, it is possible to use a method in which delay amount recording data 1001 at the preceding recording time recorded in the delay amount recording region 404 is reproduced prior to the setting of a delay amount to detect the preceding delay amount and a delay amount different from the preceding delay amount is set. Also, the delay amount may be defined without using the random numbers, for example, by generating ordinal numbers by a counter or the like and determining a delay amount on the ordinal number output.

In the above embodiment, the variable delay circuit 124 is used to shift the recording position of user data at nine steps at every 5 ns. However, in order to reduce the cost of the optical disk apparatus, it is possible to use a delay circuit which shifts the reference clock signal by ½.

In the above embodiment, the blank portion of the servo mark region is used as the user data region in order to shift the recording position of user data. However, the insurance of a room or margin for shifting the recording position of user data without enlarging the user data region is possible by enhancing the frequency of the recording clock signal and the reproduction clock signal to record smaller recording marks.

The insurance of a room for shifting the recording position of user data is also possible in such a manner that higher-efficiency codes are employed as the error correction codes to lower the redundancy, thereby reducing the error correction information recording region and thereinstead enlarging the user data region.

In the above embodiment, the phase change type recording material is used as the optical disk 7. However, even in an optical disk using an optomagnetic recording material, a longer lifetime and a higher reliability can be obtained by applying the present embodiment.

In the above embodiment, the recording of the same data at the same location is avoided by shifting the reference clock signal in the unit of time shorter than one period to shift the recording position of user data. However, without shifting the recording/reproduction clock signal relative to the reference clock signal, there can be used a method in which a code train of recording data in one segment is rotated by, for example, a shift register or the like, thereby recording a recording mark so that it is not recorded overlapping at the same location even if the same data is recorded. Even in this case, since the same data is not recorded at the same location, the deterioration of the crystalline of the optical disk medium caused by repeated rewriting is prevented, thereby making it possible to suppress the deterioration of the sensitivity of reproduction.

In the present embodiment, the delay amount recording region 404 is provided on the optical disk 7 and the delay amount recording data 1001 representing the delay amount 217 is recorded in the delay amount recording region 404. However, without limiting to this method, an optical disk apparatus fixedly including the optical disk 7 can use a construction in which the controller 134 is provided with a storage section such as RAM in which data representing the delay amount 217 is stored. On the other hand, in the case of an optical disk apparatus in which the optical disk 7 for many unspecified users is exchangeably set from the exterior, the convenience in use is provided by the construction in which the delay amount of the optical disk 7 is recorded in the optical disk 7 itself as in the above-mentioned embodiment.

Figure 14:
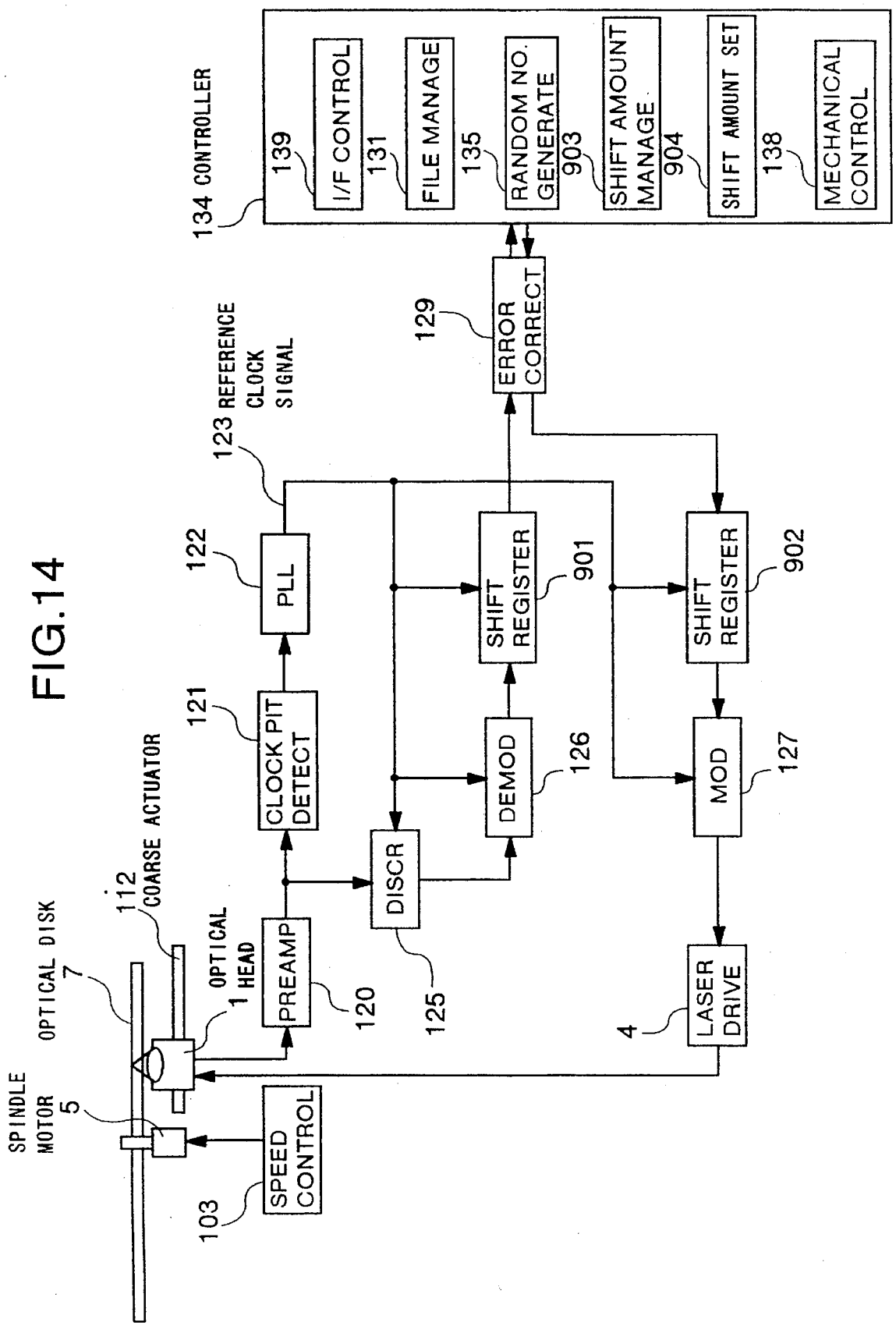
FIG. 14 is a diagram showing another embodiment of the optical disk apparatus of the present invention.

An example of an optical disk apparatus in the case where a recording data code train in one segment is rotated using a shift register will briefly be explained by use of FIG. 14. In the optical disk apparatus in the present example, the reference clock signal 123 is not delayed, unlike the optical disk apparatus shown in FIG. 6. A shift register 901 is arranged between the demodulator 126 and the error corrector 129, and a shift register 902 is arranged between the modulator 127 and the error corrector 129. Also, the controller 134 is provided with a shift amount managing section 903 and a shift amount setting section 904 for managing and setting the shift registers 901 and 902. The controller 134 manages the shift amount for rotation of the recording data code train in lieu of the delay amount to form a recording mark at a shifted recording position in a delay amount recording region.

Next, an apparatus and method for accurately detecting servo marks on the basis of a sample servo system will be explained using the drawings.

Figure 21:
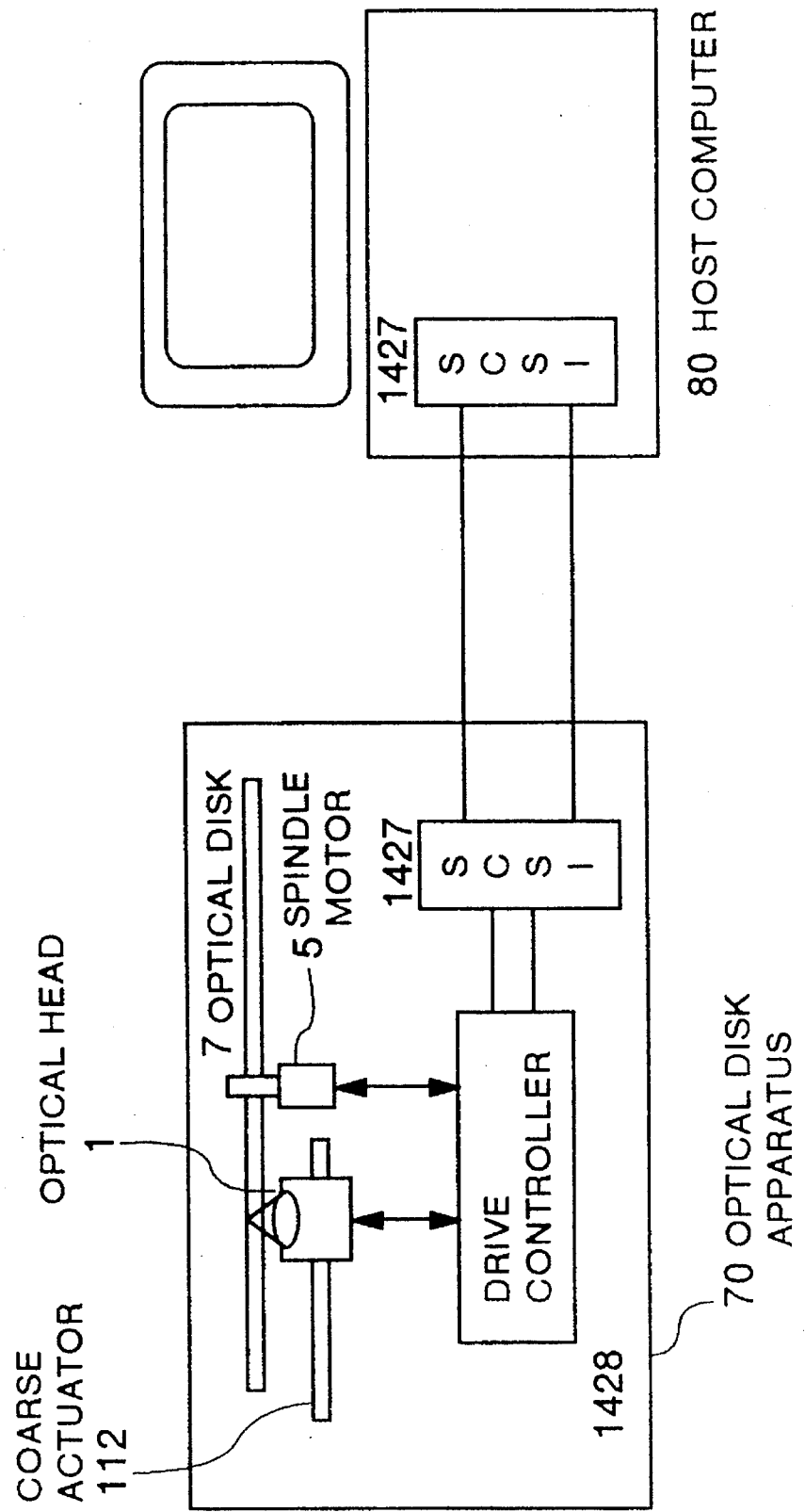
FIG. 21 is a diagram for explaining the connection of the optical disk apparatus of the present invention and a host computer.

The construction of the whole of an information recording/reproducing system is shown in FIG. 21.

As shown in FIG. 21, an optical disk apparatus 70 is connected to a host computer 80 through an interface 1427. The interface 1427 may be an SCSI interface or the like. The optical disk apparatus 70 receives data through the interface 1427 to record the received data on an optical disk 7 and reproduces data of the optical disk 7 to transfer the reproduced data to the host computer 80.

Next, the construction of an embodiment of the present invention will be explained using FIG. 17. Since mechanical parts are substantially the same as those in FIG. 6, the explanation thereof will be omitted.

To a preamplifier 1408 are connected a pit extractor 1413, a data detector 1415, an address detector 1412 and an error detector 1411.

Figure 15A:
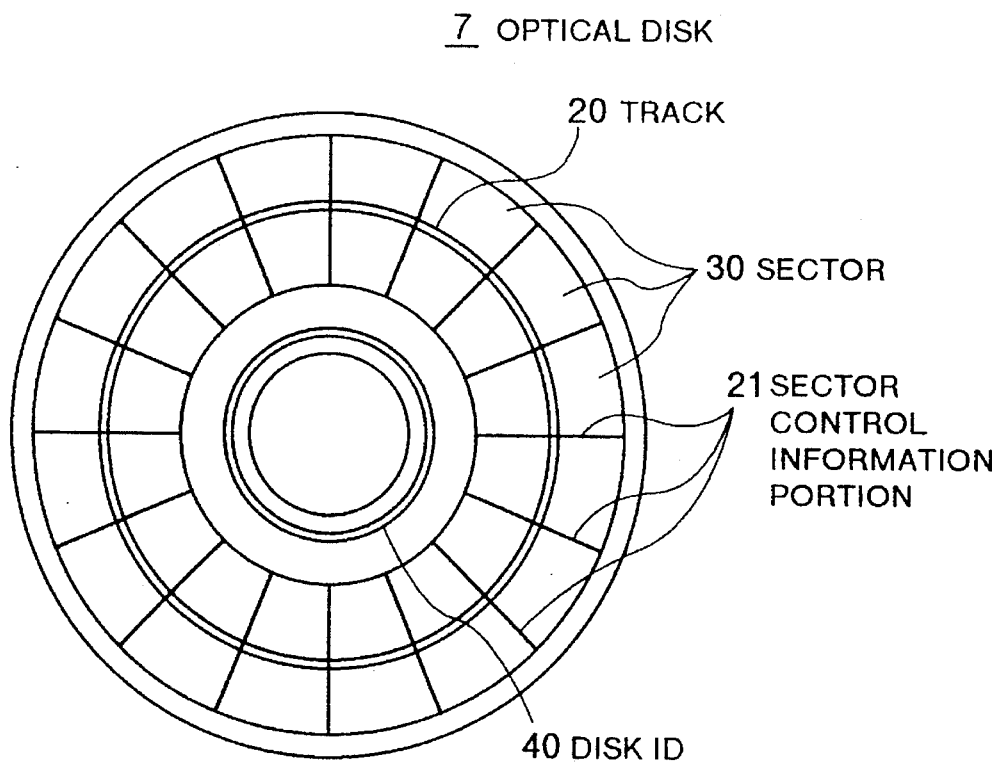
FIGS. 15A and 15B are diagrams showing the sector construction of an optical disk of the present invention.

The pit extractor 1413 extracts a reproduction signal waveform corresponding to pits in a servo mark region 100a (see FIG. 15) on an optical disk 7 and a reproduction signal waveform corresponding to marks in a data region 157a. The pit extractor 1413 is connected to a servo system PLL (Phase Locked Loop) 1419 for dividing the timing of a clock pit 102a in the servo mark region 100a at a predetermined or fixed ratio to generate a servo clock signal and a data system PLL 1420 for dividing the timing of the clock pit 102a at a set ratio to generate a data clock signal.

The data detector is inputted with the data clock signal outputted from the data system PLL 1420. The data detector 1415 discriminates an output of the preamplifier 1408 at a discrimination timing according to the data clock signal. A demodulator 1421 and an error corrector 1426 are successively connected to the data detector 1415. The demodulator 1421 reproduces data written in the data region 157a from an output of the data detector 1415. The error corrector 1426 corrects an error of the data demodulated by the demodulator 1421 and an error of data to be recorded which is received from a host computer 80. An interface 1427 is arranged between the error corrector 1426 and the host computer 80. A modulator 1416 is connected to the error corrector 1426. Data to be recorded in the optical disk 7, which is received by the error corrector 1426 from the host computer 80, is inputted to the modulator 1416. The modulator 1426 generates a recording command signal from the data to be recorded with the data being synchronized with the data clock signal. The generated recording command signal is outputted to a laser driver 4.

The address detector 1412 detects sector control information from a reproduction signal waveform of a sector control information portion 21 of the optical disk 7 with the reproduction signal waveform being synchronized with the servo clock signal. The detected sector control information is inputted to a drive controller 1428.

A table representing a relationship between a track number and a zone number of the optical disk 7 and a table representing a relationship between a zone number and a division ratio of the data system PLL 1420 are beforehand stored in the drive controller 1428. The drive controller 1428 uses these tables and a track number recorded in the sector control information portion 21 of the optical disk 7 to determine a division ratio of the data system PLL 1420. The determined division ratio is outputted to a division ratio setter 1425. The division ratio setter 1425 sets the division ratio to the data system PLL 1420.

The error detector 1411 derives a deviation of a signal for focusing control and a deviation of a signal of wobbling pits 101a for tracking control in synchronism with the servo clock signal. A controller 1418 performs the focus and tracking control of a two-dimensional actuator in an optical head 1 by controlling an actuator driver 1409 so that those deviations become zero.

A sector control information writer 1422 is arranged between the drive controller 1428 and the laser driver 4. In accordance with an instruction from the drive controller 1428, the sector control information writer 1422 forms a signal representative of information indicating that the data recording system of the data region 157*a* of the optical disk 7 is a zone system characteristic of the present embodiment, and additionally writes that information into the sector control information portion 21. In the case where the data recording system is the conventional CAV system, no information is additionally written.

Next, further explanation will be made of the optical disk 7 by use of FIG. 15.

The optical disk 7 of the present embodiment has the diameter of 64 mm. The diameter of the innermost circumference of a recording area is 30 mm and the diameter of the outermost circumference thereof is 60 mm.

Figure 22:
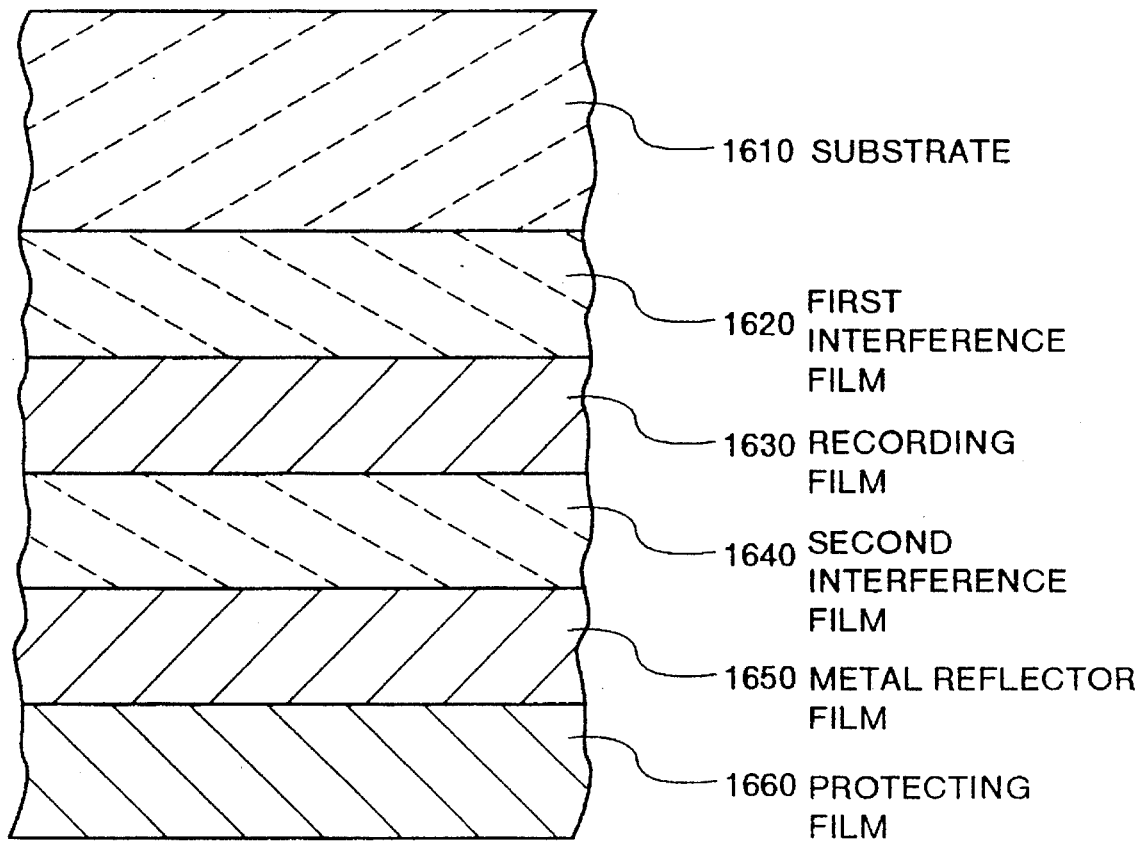
FIG. 22 is a cross section showing the layer construction of an optical disk of the present invention.

As shown in FIG. 22, the optical disk 7 includes the successive lamination of a transparent substrate 1610 made of glass, polycarbonate, PMMA or the like, a first interference film 1620 having the refractive index of about 2 and made of a transparent dielectric such as SiN, AlN, ZnS or the like, an over-writable recording film 1630 made of InSbTe, GeSbTe or the like, a second interference film 1640 made of a transparent dielectric similar to the first interference film, a metal reflector film 1650 made of Au, Al or the like, and a protecting film 1660 made of $SiO_2$, UV resin or the like. The optical disk 7 is such that the direct overwriting of new information on the preceding information is possible by only the irradiation with a laser beam.

Figure 15B:
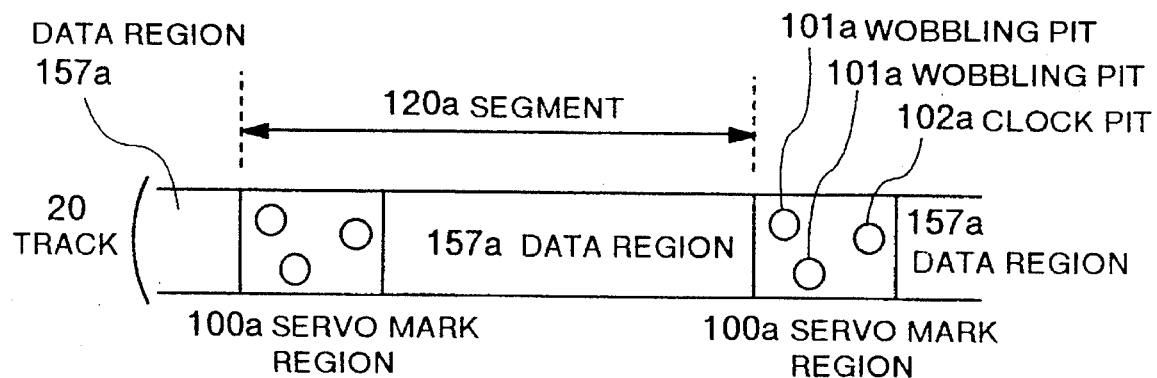
Figure 16:
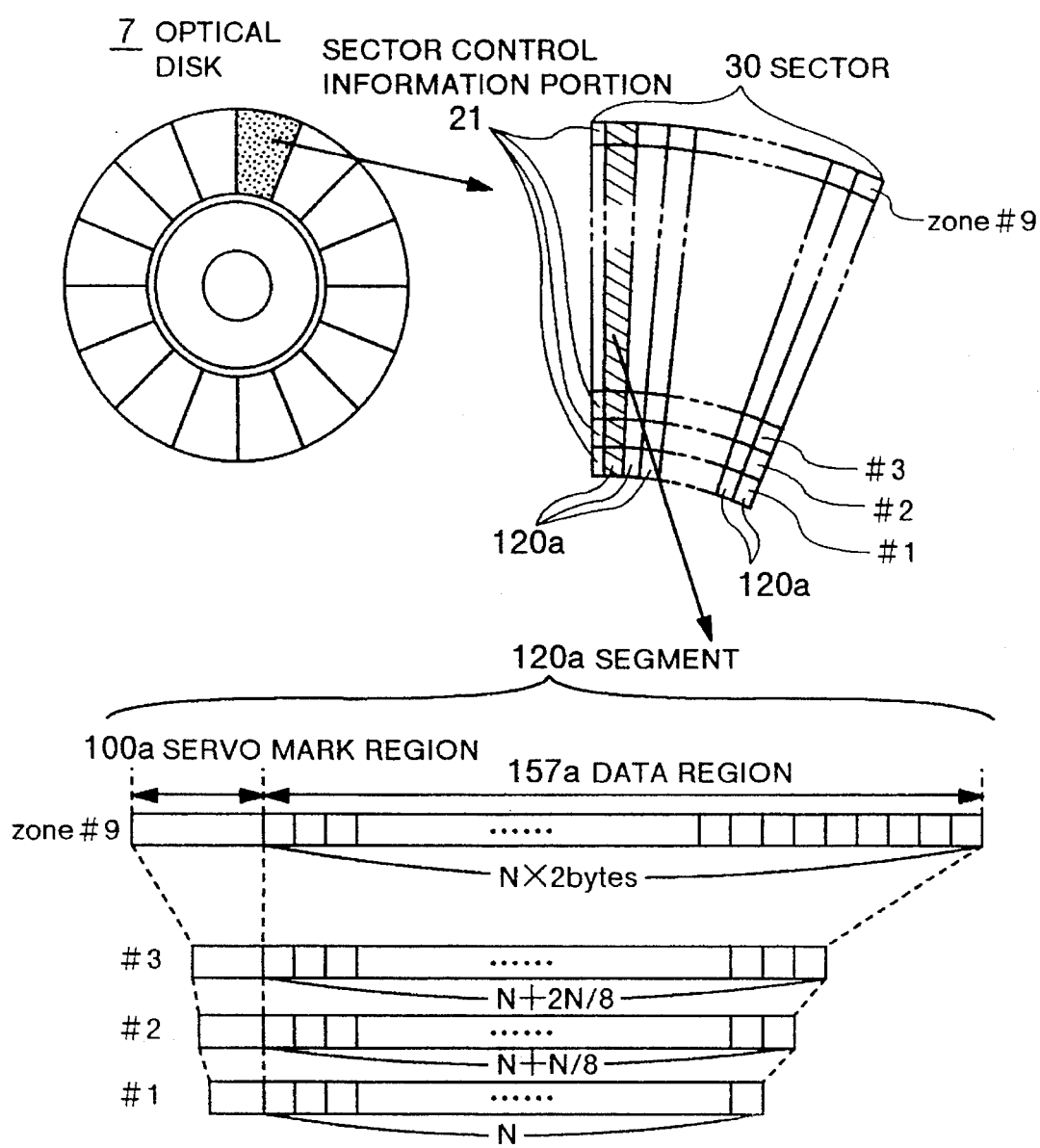
FIG. 16 is a diagram showing the construction of one sector shown in FIG. 15A.

A spiral track 20, sector control information portions 21 and a disk ID 40 are preformatted on the optical disk 7 in the recessed/raised form of the substrate. (In FIG. 15A, only one circumference of the spiral track 20 is shown circularly.) In the shown example, the disk 7 is divided into sixteen sectors 30 and the sector control information portion 21 is arranged for each sector 30. Each sector 30 is divided into forty three segments 120*a*. One segment includes a servo mark region 100*a* and a data region 157*a*, as shown in FIG. 15B. The servo mark regions 100*a* and the data regions 157*a* are continuously formed on the track 20. Wobbling pits 101*a* for tracking servo and a clock pit 102*a* for a reference clock signal of a recording/reproducing circuit are preformatted in the servo mark region 100*a*. Like an optical disk medium preformatted on the basis of the conventional CAV system, the servo mark regions 100*a* are positioned radially from the center of the optical disk 7, as shown in FIG. 16.

Parameters necessary for operating the optical disk apparatus are preformatted in the disk ID 40 at the specified disk rotation speed and modulation frequency. The parameters includes information concerning the kind of the medium, the reflectance, the sensitivity of recording and so forth as the attribute of the disk 7. These parameters are read and processed by the drive controller 1428 at the time of initialization or disk insertion.

Information including a track number, a sector number and a sector identification mark are preformatted in the sector address information portion 21.

In the optical disk 7 of the present embodiment, the servo mark regions 100a are positioned radially from the center of the optical disk 7, as in an optical disk preformatted on the basis of the conventional CAV system. On the other hand, as shown in FIG. 16, the optical disk 7 is equidistantly divided into nine zones from the inner circumference to the outer circumference, as in the conventional ZCAV system. The zone number includes 1 to 9 toward the outer circumference from the inner circumference. The innermost circumference zone#1 is recorded with data of N bytes per segment. Provided that the number $\underline{n}$ of divisional zones is 9, the adjacent or next zone#2 is recorded with data of N+N/(n−1) per segment. Similarly, the outermost circumference zone #9 is recorded with data of 2N per segment. As the zone goes toward the outer circumference, the storage capacity per segment is thus increased. Thereby, the linear recording density of data for each segment 120*a* can be made substantially constant. The number of recording bytes per one segment depends on a modulating system. In the case where the shortest mark length is about 0.6 μm and 8–10 modulation is employed, data of N=24 bytes per segment can be recorded in the innermost circumference zone#1. Provided that the track pitch is 1.5 μm, the overall storage capacity of the optical disk medium is about 110 MB in the case where the recording is made on the basis of the CAV system. In the present embodiment, on the other hand, the overall storage capacity is increased to about 160 MB by changing the recording data amount per segment for each zone.

Next, explanation will be made of the operation of the optical disk apparatus of the present embodiment.

In the present embodiment, as mentioned above, the servo mark regions 100*a* are radially arranged on the optical disk 7 to employ a sample servo format while a possible recording area is concentrically divided into nine zones and the amount of data recorded for one segment is changed for each zone so that the linear recording density of data for each segment is made substantially constant between the inner circumference zone and the outer circumference zone of the optical disk. Also, the angular velocity (or speed) of rotation of the optical disk 7 is made constant irrespective of the zone.

When a sample servo format is employed in an optical disk medium, there is a merit that the optical system of an optical head for recording/reproduction becomes simple since recorded data and a tracking error signal can be obtained by processing one detection signal in a time division manner. However, if it becomes impossible to detect servo marks at a predetermined timing, it becomes impossible not only to make the recording/reproduction of data but also to have a light beam follow the track. In the conventional ZCAV system, since each of the linear recording density for each sector and the linear recording density for each segment is made substantially constant, the recording capacity can be increased. However, when access from one zone to the adjacent zone is made, it is necessary to discretely change the frequency of a reference clock signal of a servo system. Accordingly, if the sample servo format is employed in the conventional ZCAV system, a light beam is liable to a fear that it cannot follow the track. In the present embodiment, however, a servo clock signal for reading servo marks and a data clock signal for reading data are provided in different systems, thereby making it possible to provide a construction in which servo mark regions 100*a* are radially arranged in a manner similar to that in the conventional CAV system to keep the frequency of a reference clock signal of the servo system constant while zones are arranged so that the amount of data recorded for one segment is changed for each zone.

First, explanation will be made of the operation in the case where data of the optical disk 7 is reproduced using the optical disk apparatus. The operation is performed in such a manner that the drive controller 1428 gives the instructions of operations to the respective sections. The operation of the drive controller 1428 is controlled by a microprocessor incorporated therein.

The drive controller 1428 operates the laser driver 4 to read a disk ID 40 of the optical disk 7. The laser driver 4 excites a semiconductor laser in an optical head 1 so that the optical disk 7 is irradiated with reproduction light. Light reflected from the optical disk 7 is converted into an electric signal by a photo detector in the optical head 1. The electric signal is amplified by the preamplifier 1408 so that recorded information on the optical disk 7 is reproduced as an RF signal. Subsequently, the pit extractor 1413 extracts pits from the amplitude pattern of the RF signal and the servo system PLL 1419 divides a signal corresponding to a clock pit 102$a$ at the predetermined or fixed ratio to generate a reference clock signal of the servo system (or a servo clock signal). In order that the servo system PLL 1419 generates the reference clock signal having a constant frequency, the division number (or division ratio) in a feedback loop of the servo system PLL 1419 is fixed.

The error detector 1411 reproduces servo signals for focusing and tracking on the basis of the servo clock signal. The controller 1418 controls the focusing and tracking control of the two-dimensional actuator in the optical head 1 through the actuator driver 1409 so that those deviations become 0.

On the basis of the servo clock signal, the address detector 1412 reproduces sector control information inclusive of a track number, a sector number and so on recorded in the sector control information portion 21 and information representative of a data recording system additionally written in the sector control information portion 21. In the case where the information representative of the data recording system is information indicating a zone system characteristic of the present embodiment, the drive controller 1428 uses the tables included therein or the table representing the relationship between a track number and a zone number and the table representing the relationship between a zone number and a division ratio of the data system PLL 1420 to determine, from the track number, a zone to which the corresponding track belongs and a division ratio of the data system PLL 1420 which is necessary for generating a data clock signal used for data of a data region 157$a$ of the determined zone. Information of the determined zone and division ratio is outputted to the division ratio setter 1425. The division ratio setter 1425 sets the division ratio to the data system PLL 1420.

In the case where no mark indicating that the recording is made on the basis of the zone system characteristic of the present embodiment is recorded in the sector control information portion 21, the drive controller 1428 judges the data recording system as being the CAV system. In the case where the data recording system is the conventional CAV system, a division ratio equal to a division ratio set to the servo system PLL 1419 is outputted to the division ratio setter 1425 irrespective of the track number. The table beforehand stored in the drive controller 1428 defines the division ratio of the data system PLL 1420 so as to provide the recording density shown in FIG. 16.

The data system PLL 1420 divides the timing of the signal corresponding to the clock pit 102$a$ at the set division ratio to generate a reference clock signal for data (or a data clock signal).

In the case where data is reproduced on the basis of the zone system characteristic of the present embodiment, the division ratio in a feedback loop of the data system PLL 1420 differs for each zone. On the other hand, in the case where data is reproduced in the CAV system, the data clock signal equal to the servo clock signal is outputted from the data system PLL 1420 irrespective of the track number, the recording/reproducing for the optical disk 7 subjected to recording based on the CAV system can easily be realized.

Figure 25:
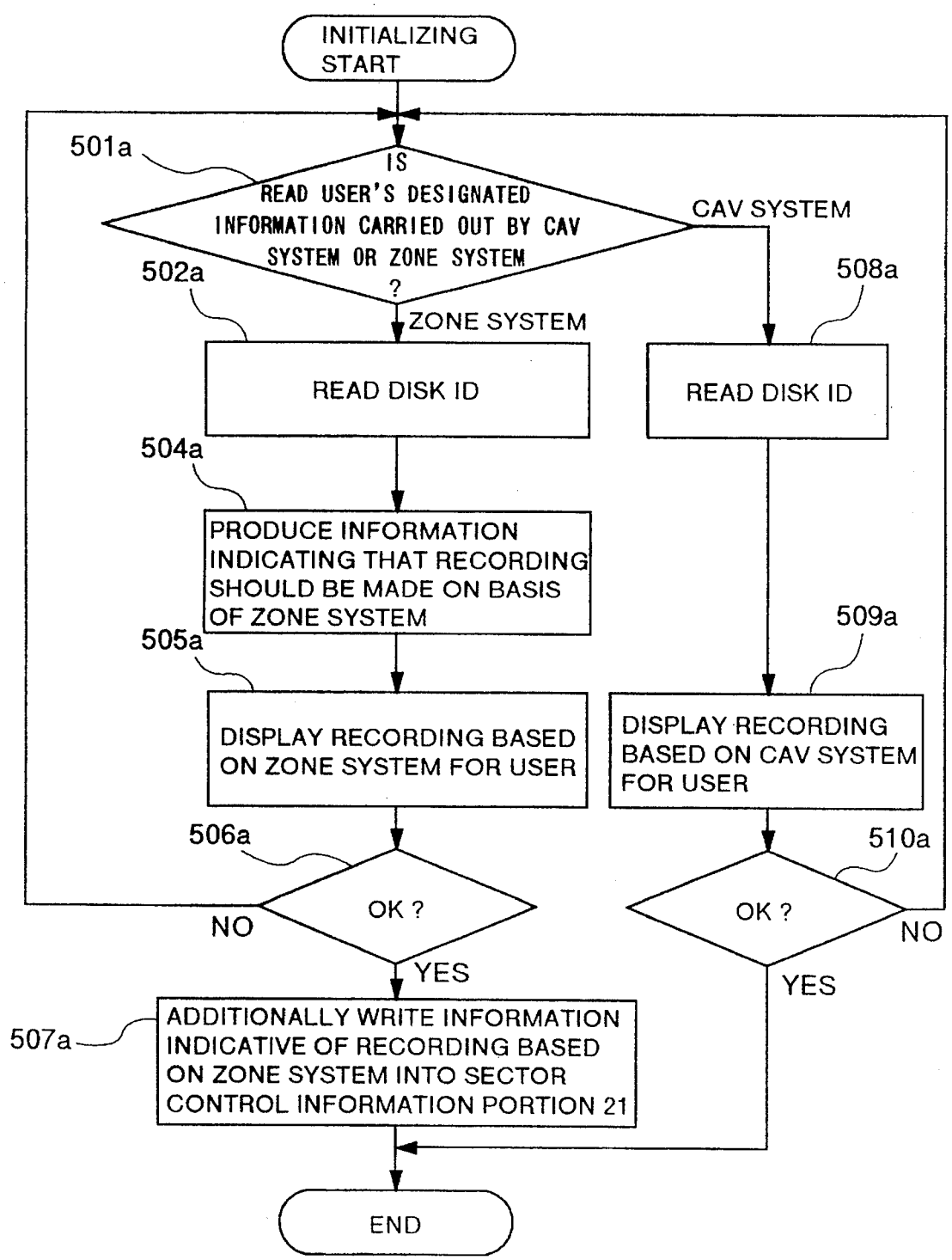
FIG. 25 is a flow chart showing another embodiment of the procedure of initialization of an optical disk.

In the case where the recording of data is to be performed for the optical disk 7 in the optical disk apparatus of the present invention, the initialization of the optical disk 7 is made as shown in FIG. 25.

As shown in FIG. 25, the drive controller 1428 first receives through the host computer 80 an instruction from a user as to whether the recording should be made on the basis of the conventional CAV system or the zone system characteristic of the present embodiment (step 501$a$). At this time, it is possible to use a construction in which a display unit of the host computer 80 displays thereon the value of a storage capacity of the optical disk 7 in units of mega byte in the case where the recording is made on the basis of the CAV system and that in the case where the recording is made on the basis of the zone system characteristic of the present embodiment. Next or in step 502$a$, the disk ID 40 is read from the optical disk 7 in the same operation as that at the time of reproduction mentioned above. In the case where the instruction for the recording based on the zone system is received from the user in step 501$a$, there are determined a signal indicating that the recording is made on the basis of the zone system and a position at which this signal is to be additionally recorded (step 504$a$). In step 505$a$, information indicating that the recording is to be made on the zone system is displayed on the display unit of the host computer 80. In the case where a confirmation is obtained from the user (step 506$a$), information indicating that the recording is made on the basis of the zone system is additionally written into the sector control information portion 21.

In the case where the user gives the instruction for the recording based on the CAV system in step 501$a$, the disk ID 40 is read (step 508$a$) and a confirmation is made to the user (step 509$a$). No information is additionally written into the sector control information portion.

In a manner similar to that at the time of reproduction, the servo system PLL 1419 generates a servo clock signal and the address detector 1412 detects a track number by use of the servo clock signal.

In the case where the recording is to be made on the basis of the zone system, the drive controller 1428 determines a division ratio for each zone from the detected track number in a manner similar to that at the time of reproduction and the data system PLL 1420 generates a data clock signal. The modulator 1416 generates a signal representative of information to be recorded in a data region 157$a$ in synchronism with the data clock signal. The generated signal to the laser driver 4 is transferred to the laser driver 4 so that it is recorded on the optical disk 7 by the optical head 1. Thereby, data is recorded in the data region 157$a$ with a linear recording density as shown in FIG. 16 while the frequency of the data clock signal is changed for each zone.

In the case where the recording is to be made on the basis of the CAV system, the same division ratio as that set to the servo system PLL 1419 is set to the data system PLL 1420 by the drive controller 1428. Thereby, the frequency of the data clock signal is always constant irrespective of a track number and data is recorded in a data region 157$a$ on the basis of the CAV system.

Thus, the optical disk apparatus of the present embodiment makes it possible to generate a servo clock signal on the basis of the sample servo system in such a manner that the optical disk 7 with preformatted servo marks 100$a$ arranged radially from the center of the optical disk 7 is used and is rotated at a constant angular rotation velocity in a manner similar to that in the conventional CAV system. Accordingly, since the frequency of the servo clock signal is constant over the entire track, there are a merit that the servo marks can easily be detected over the entire track and hence it is easy to have a light beam follow the track as well as a merit that the construction of an optical head is simple.

On the other hand, in the optical disk apparatus of the present embodiment, the servo clock signal and the data clock signal are separately used. Therefore, it is possible to arrange zones of the recording system characteristic of the present embodiment so that the linear recording density becomes substantially constant for all the zones. The data clock signal is generated by dividing a signal corresponding to clock pits at different division ratios for respective zones. With this construction, since the servo clock signal becomes constant even when the optical head passes the boundary between two zones, the optical head can always follow the servo mark and hence it becomes possible to have a light beam follow the track. Further, since the linear recording density of data is substantially constant for each zone independently of the servo mark, the storage capacity can be increased as compared with that in the conventional CAV system.

Also, the optical disk apparatus of the present embodiment has a merit that it is possible to selectively use the conventional CAV system and the zone system characteristic of the present embodiment as a recording/reproducing system. Further, the optical disk 7 having servo mark regions 100a preformatted radially from the center of the optical disk on the conventional CAV system can be used as it is. Accordingly, the optical disk 7 subjected to recording by an optical disk apparatus of the conventional CAV system can be subjected to reproduction by the optical disk apparatus of the present embodiment on the basis of the CAV system. Furthermore, the optical disk 7 preformatted on the basis of the conventional CAV system can be subjected to recording by use of the optical disk apparatus of the present embodiment on the basis of the zone system characteristic of the present embodiment. Still further, the optical disk 7 subjected to recording by the optical disk apparatus of the present embodiment on the basis of the CAV system can be subjected to reproduction by the conventional optical disk apparatus.

The above-mentioned embodiment has been explained in conjunction with the construction in which the optical disk 7 is equally divided into nine zones. However, the present invention is limited to this construction. There can be employed a construction in which the optical disk 7 is divided into zones the number of which is equal to a number designated by a user. In this case, a table for each of a designatable number of zones is beforehand stored in the drive controller 1428 and a designation as to the zone division number or the number of divisional zones is also received from the user in receiving the instruction for the recording based on the zone system from the user in step 501a of FIG. 25. The received zone division number is additionally written into the optical disk in step 507a of FIG. 25. And, when setting a division ratio for generating a data clock signal at the time of recording/reproduction, the drive controller 1428 uses the table corresponding to the additionally written zone division number.

Figure 18:
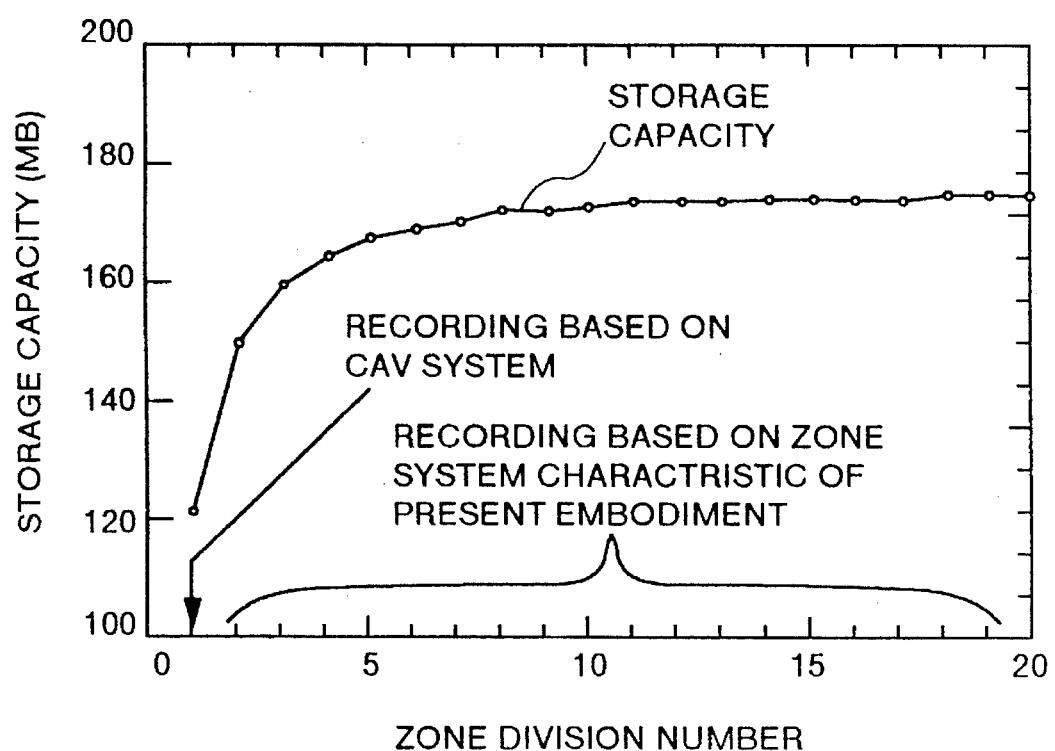
FIG. 18 is a diagram showing the change of a storage capacity in the case where a zone division number or the number of divisional zones is changed.

FIG. 18 estimates a relationship between the zone division number for one optical disk and the storage capacity of the disk. The conditions of calculation are such that the diameter of the optical disk is 65 mm, the data area is 30 to 60 mm$\phi$, the servo system is a sample servo system, the center value of a disk rotation speed is 3600 rpm, the data modulating system is 8–10 modulation, the basic pulse width of data is 90 ns, a storage capacity per sector is 512 bytes, and the division into zones is equally made in the direction of radius of the optical disk. In FIG. 18, the case of the zone division number equal to 1 corresponds to the conventional CAV system. As seen in FIG. 18, the overall storage capacity of the disk increases with the increase of the zone division number but becomes a substantially constant value of about 70 MB when the zone division number becomes equal to or larger than 10.

As shown in the foregoing, the present embodiment uses the optical disk 7 on which the sector control information portions 21 and the servo mark regions 100a are preformatted. A capacity per physical sector 30 increases for each zone toward the outer circumference track from the inner circumference track. In uses in a personal computer, since it is desirable that a logical sector is constant as 512 bytes or 1024 bytes, each of the demodulator 1421 and the modulator 1416 can be provided with a function of converting the physical sector with a change for each zone into the fixed-length logical sector.

In such a case, there may be considered a method in which the logical sector is partitioned in each one circumference of the track and a method in which the logical sector is partitioned in each zone.

In the case where the logical sector is partitioned in each one circumference of the track, one circumference of the track is partitioned at every 512 bytes or 1024 bytes over the physical sectors 30 so that one partition is defined as a logical sector. The last sector insufficient for 512 bytes or 1024 bytes, if any, is not subjected to recording. This method has a merit that there is no case where a logical sector is arranged over tracks.

In the case where the logical sector is partitioned in each zone, one circumference of the track is partitioned at every 512 bytes or 1024 bytes over the physical sectors 30 so that one partition is defined as a logical sector. To the last sector insufficient for 512 bytes or 1024 bytes, if any, is added the first capacity of the next track to amount to 512 bytes or 1024 bytes, thereby providing one physical-sector. The above is repeated for the tracks in one zone. If a sector at the end of the outermost circumference track in one zone is not sufficient for 512 bytes or 1024 bytes, this sector is not subjected to recording. In this method, though the logical sectors are arranged across the tracks, no problem is offered or an access time between tracks is not necessary in the case of the recording system of the present embodiment in which the tracks are arranged in a spiral form as a whole but the frequency of the data clock signal is the same for the tracks so long as the tracks are tracks in one zone. Also, since the number of logical sectors subjected to no recording is only one at the greatest in each zone, there is a merit that the capacity is not spoilt. In the case where the recording is made on the basis of the zone system characteristic of the present embodiment, the frequency of the data clock signal changes between zones but no change of the frequency of the data clock signal in the course of the logical sector is caused since the logical sector is not arranged across zones.

Next, an optical disk apparatus according to another embodiment of the present invention will be explained using the drawings.

Figure 17:
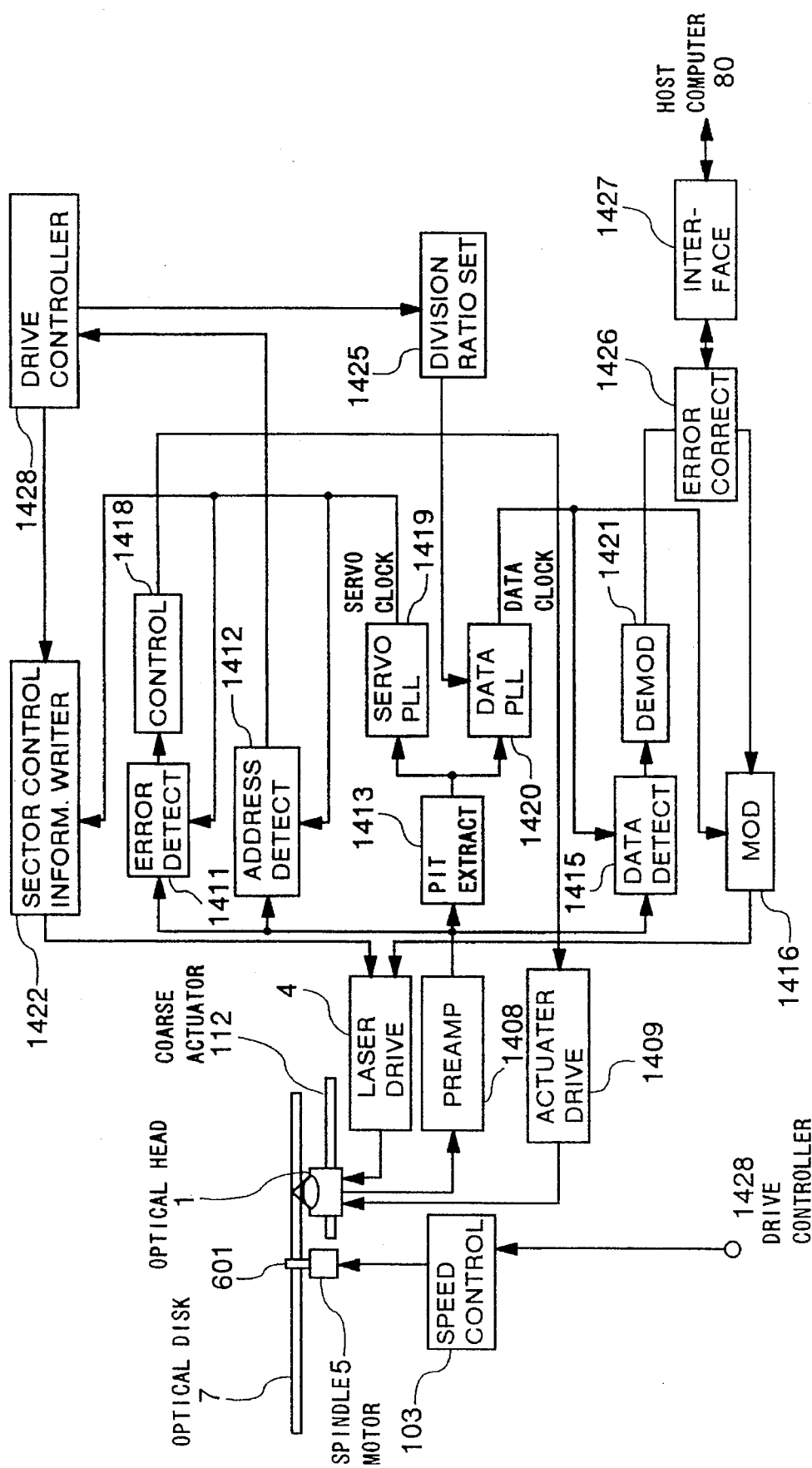
FIG. 17 is a diagram showing another embodiment of a control section of the optical disk apparatus of the present invention.

In the optical disk apparatus of the foregoing embodiment shown in FIG. 17, the optical disk 7 is equally divided into nine zones. However, the present invention is limited to this construction. There can be employed a construction in which the optical disk 7 is divided into zones having their capacities designated by a user at the time of initialization.

Also, in a general MSDOS personal computer, it is desirable owing to a restriction on the address space of a CPU that the capacity of a disk is made equal to or smaller than about 32 MB in order to recognize the disk as one area. Therefore, a method is used in which a disk is divided into some partitions to manage the respective partitions as different devices. Accordingly, in an optical disk having a storage capacity larger than 100 MB, it is desirable to provide a 1:1 correspondence between partitions and the zones. When a partition is constructed over zones, it is necessary to change over the frequency of a reference clock signal of a data system (or a data clock signal) between zones. Therefore, as the case may be, an effective access time becomes long since a certain time is required until the clock signal is stabilized. The such correspondence between partitions and zones can be realized with a construction in which the optical disk 7 is divided or partitioned into zones having their capacities designated by a user at the time of initialization.

In connection with the optical disk apparatus shown in FIG. 17 using the optical disk 7 having the sector control information sections 21 preformatted thereon, it has been shown that each of the demodulator 1421 and the modulator 1416 can be provided with a function of making a conversion between a logical sector and a physical sector. However, the conversion between a logical sector and a physical sector can be eliminated by using an optical disk 7 having no sector control information sections 21 preformatted thereon and additionally writing the sector control information portions 21 at the time of initialization.

An optical disk apparatus will now be explained which simultaneously realizes both the construction for allowing the division of the optical disk 7 into zones having their capacities designated by the user at the time of initialization and the construction for allowing the elimination of the conversion between a logical sector and a physical sector by additionally writing sector addresses at the time of initialization. The explanation will be made using FIG. 26.

Figure 26:
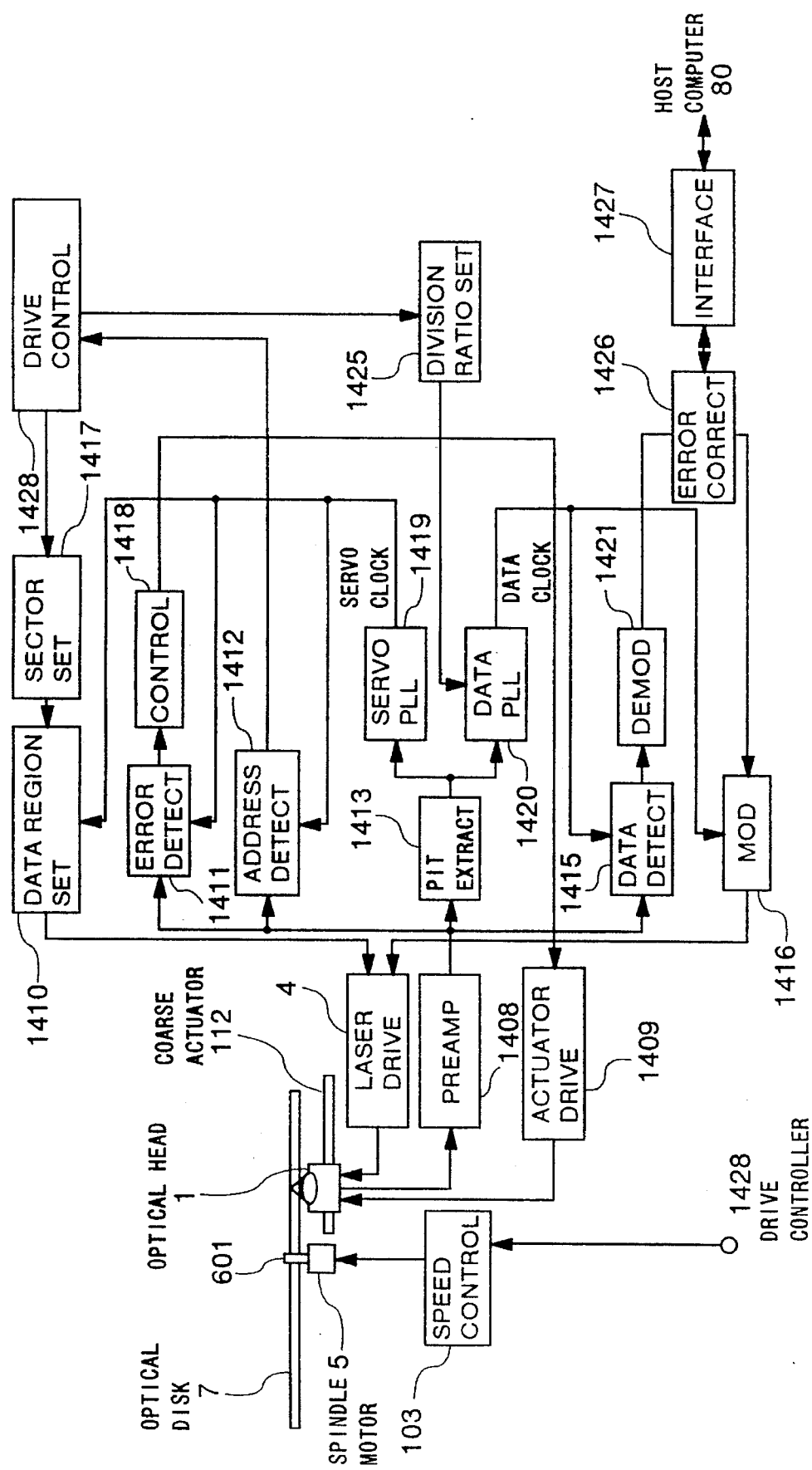
FIG. 26 is a diagram showing a further embodiment of the optical disk apparatus of the present invention.

The optical disk apparatus of the present embodiment shown in FIG. 26 is substantially similar in construction to the optical disk apparatus shown in FIG. 17 but is different therefrom in that a sector setter 1417 and a data region setter 1410 are arranged in lieu of the sector control information writer 1422. The data region setter 1410 is inputted with a servo clock signal from the servo system PLL 1419. The sector setter 1417 generates a signal representative of sector control information to be additionally written on the optical disk 7 in accordance with an instruction from the drive controller 1428. In accordance with an instruction from the drive controller 1428 through sector setter 1417, the data region setter 1410 determines a position for writing of the sector control information by counting the servo clock signal and transfers the signal representative of sector control information generated by the sector setter 1417 to the laser driver 1407.

The operation of the optical disk apparatus shown in FIG. 26 will now be explained.

Since the operation in the case where the reproduction from the optical disk 7 is made is the same as that of the optical disk apparatus shown in FIG. 17, the explanation thereof will be omitted. A table in the drive controller 1428 is not beforehand stored but is produced by the driver controller 1428 at the time of initialization of the optical disk.

The operation of initialization at the time of recording to the optical disk 7 in the optical disk apparatus shown in FIG. 26 is different from that in the optical disk apparatus shown in FIG. 17 and will now be explained using FIG. 19.

Figure 19:
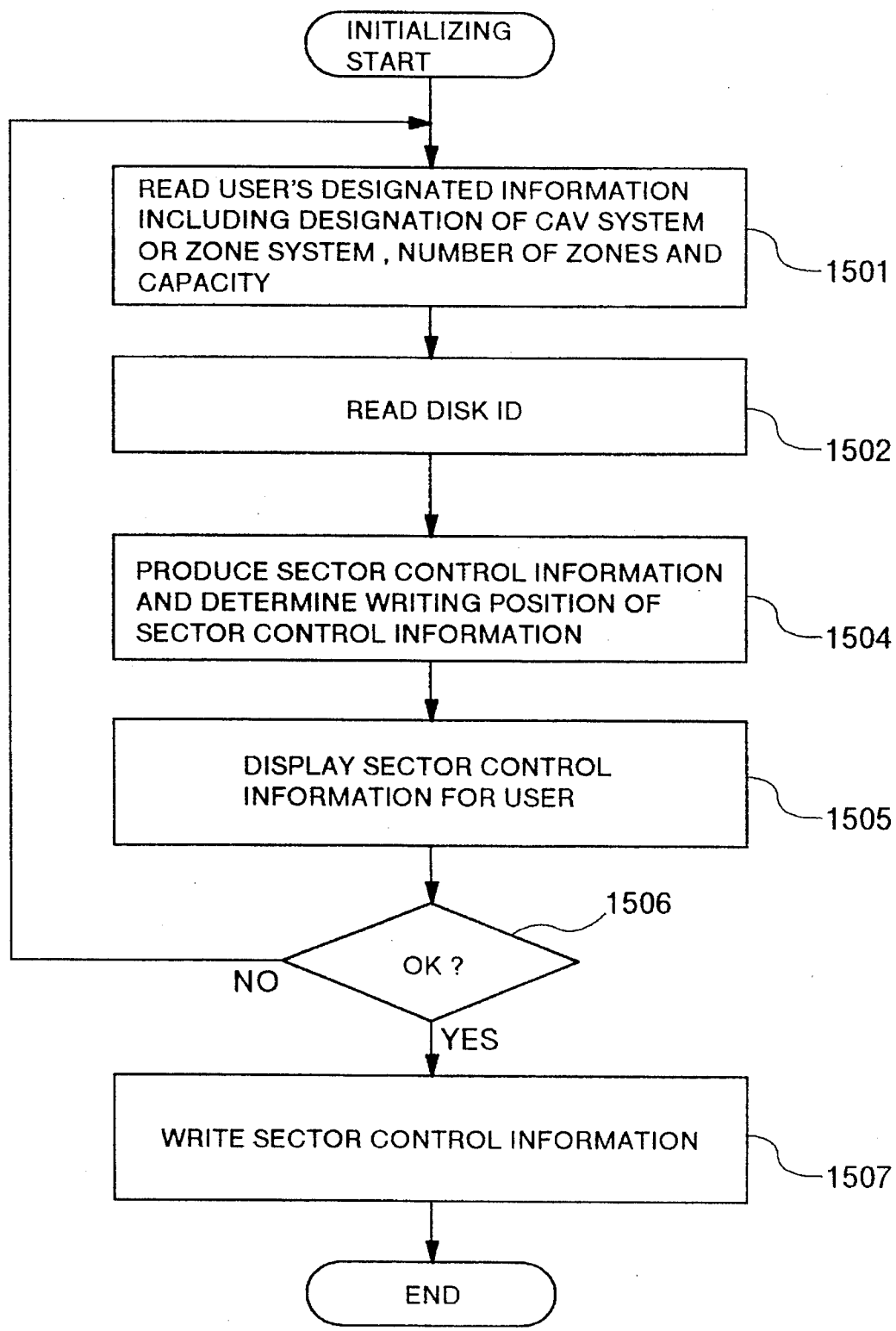
FIG. 19 is a flow chart showing the procedure of initialization of an optical disk.

As shown in FIG. 19, there is first received a designation from a user as to whether the recording should be made on the basis of the conventional CAV system or the zone system characteristic of the present embodiment (step 1501). In the case of the CAV system, a designation as to the value of a capacity per logical sector is further received. In the case of the zone system, the drive controller 1428 receives through the host computer 80 a designation as to the number of zones to be established, the value of a capacity of each zone and the value of a capacity per logical sector. (Here, it should be noted that a correspondence between partitions and zones is 1:1.) A method for reception can use, for example, a construction in which the user is made to display, on a display unit of the host computer 80, the value of a storage capacity of the optical disk 7 in units of mega byte in the case where the recording is made on the basis of the CAV system and that in the case where the recording is made on the basis of the zone system characteristic of the present embodiment. Further, there can be employed a construction in which after the reception of the designation as to the number of zones, the value of a capacity of each zone, in the case where the designated number of zones are established by equally dividing the optical disk 7 in the direction of radius thereof, is displayed on the display unit of the host computer 80 to accept the setting of the capacity of each zone desired by the user in such a manner that the change of the displayed zone capacity from the user is accepted. With such a construction, the user can easily set the capacity of each zone. Also, in accordance with a request from the host computer 80, the drive controller 1428 receives information to be written in the optical disk 7 which includes partition information of the division into partitions, directory information and so forth.

Next or in step 1502, the disk ID 40 is read from the optical disk 7 in the same operation as that at the time of reproduction.

In step 1504, the drive controller 1428 produces information to be written in the sector control information portion 21 and determines a position on the optical disk 7 at which the sector control information is to be written. More particularly, in the case where the CAV system is designated from the user in step 1501, the same information as sector control information in the conventional CAV system including a sector number, a track number, a sector recognition mark and so forth is produced as the sector control information. And, physical sectors are established with a constant capacity so as to provide the same capacity as that of the logical sector received from the user in step 1501 and the writing position of the sector control information is determined so that the sector control information is written at the leading portion of the physical sector. On the other hand, in the case where the zone system is designated from the user in step 1501, not only sector control information having the same contents as those in the CAV system but also information indicating that the recording system is the zone system, information indicating a zone division number and the capacity of each zone and partition information requested by the host computer 80 to be written are produced as sector control information. Also, physical sectors are established with a constant capacity so as to provide the same capacity as that of the logical sector received from the user in step 1501 and the writing position of the sector control information is determined so that the sector control information is written at the leading portion of the physical sector. In the case of the zone system, the drive controller 1428 further produces a table representing a relationship between a zone number of the established zone and a track number and a table representing a relationship between a zone number and a division ratio of the data system PLL 1420 and stores it in a memory in the drive controller.

In step 1505, the sector control information produced in step 1504 is displayed on the display unit of the host computer 80. In the case where a confirmation is obtained from the user (step 1506), the sector control information and the writing position thereof are outputted to the sector setter 1417. The sector setter 1417 generates a signal representing the received sector control information. The data region setter 1410 counts the servo clock signal to determine the sector control information writing position received from the drive controller 1428 through the sector setter 1417 and transfers the sector control information to the laser driver 4 when the optical head 1 reaches that position, so that the sector control information is written at the leading portion of the physical sector (step 1507). Thereby, the initialization of the optical disk is completed.

In the case where data is to be written in a data region 157a, the generation of a servo clock signal by the servo system PLL 1419 and the detection of a track number by the address detector 1412 using the servo clock signal are made in a manner similar to that at the time of reproduction. The drive controller 1428 determines a division ratio for each zone by use of the table produced at the time of initialization so that the data system PLL 1420 generates a data clock signal. The modulator 1416 generates a signal representative of information to be recorded in the data region 157a in synchronism with the data clock signal. The signal is transferred to the laser driver 4 so that it is recorded on the optical disk 7 by the optical head 1. Thereby, data is recorded in the data region 157a with the frequency of the data clock signal being changed for each zone.

Thus, in the optical disk apparatus of the embodiment shown in FIG. 26, since it is possible to make the physical sector and the logical sector coincident with each other by additionally writing the sector control information, it is not necessary to make a conversion between the physical sector and the logical sector. Further, in the case where the recording/reproduction is made on the basis of the zone system characteristic of the present embodiment, it is possible to arrange zones having their capacities desired by a user. Accordingly, it becomes possible to make a zone coincident with a partition having a desired capacity. Therefore, the user can handle one zone as one medium with no need to make a correspondence between partitions and zones.

The above embodiment uses the construction in which the table produced by the drive controller 1428 is stored in the memory of the drive controller 1428. Alternatively, there can be used a construction in which this table is stored in a predetermined portion of the optical disk 7. In such a case where the table is stored in the optical disk 7, the optical disk 7 subjected to recording based on the zone system characteristic of the present embodiment can be subjected to compatible recording/reproduction among a plurality of optical disk apparatuses having the construction shown in FIG. 26. Also, in the optical disk apparatus shown in FIG. 26, since the sector control information and data can be recorded and reproduced on the basis of the conventional CAV system, an optical disk 7 subjected to recording based on the CAV system can be subjected to compatible recording/reproduction between the conventional optical disk apparatus in which the recording/reproduction is made on the basis of the CAV system and the optical disk apparatus of the embodiment which is shown in FIG. 25.

In the above embodiment, partitions and zones have a 1:1 (or one-to-one) correspondence therebetween. However, it is possible to use a one-to-many or many-to-one correspondence. This will now be explained using FIGS. 20A to 20C.

FIGS. 20A to 20C show different relationships between partitions and zones. The partition indicates a logical file whereas the zone indicates a physical recording region on an optical disk. Three relationships as shown in FIGS. 20A to 20C can be considered between the size of the partition and the size of the zone. Either of the three relationships can be realized in the optical disk apparatus of the embodiment shown in FIG. 25. FIG. 20A shows the case where a partition is smaller than a zone. FIG. 20B shows the case where the size of a partition is coincident with the size of a zone. FIG. 20C shows the case where the size of a partition is larger than the size of a zone. It can be said that the case of FIG. 20A or 20B is most suitable for the case of the zone system characteristic of the present embodiment. Namely, since a user of a disk and a DOS (Disk Operating System) regard a partition as being one device, a some wait time upon transition from one partition to another partition offers no problem. In the systems of FIGS. 20A and 20B, since no change-over of zones in the same partition occurs, there is no case where the frequency of a data clock signal is changed over in the same partition upon transition from one zone to another zone, thereby yielding a wait time until stabilization. On the other hand, in the system of FIG. 20C, since information is recorded over zones even in the same partition, the frequency of a data clock signal is changed over upon transfer from one zone to another zone in the same partition, thereby yielding a wait time until stabilization. Meanwhile, the systems of FIGS. 20A and 20B have a restriction that it is not possible to make the partition size larger than the zone size but the system of FIG. 20C has not such a restriction. Therefore, it can be said that the system of FIG. 20C is suitable for the case where it is desired to make the size of one partition even if an access time is sacrificed more or less.

Figure 23:
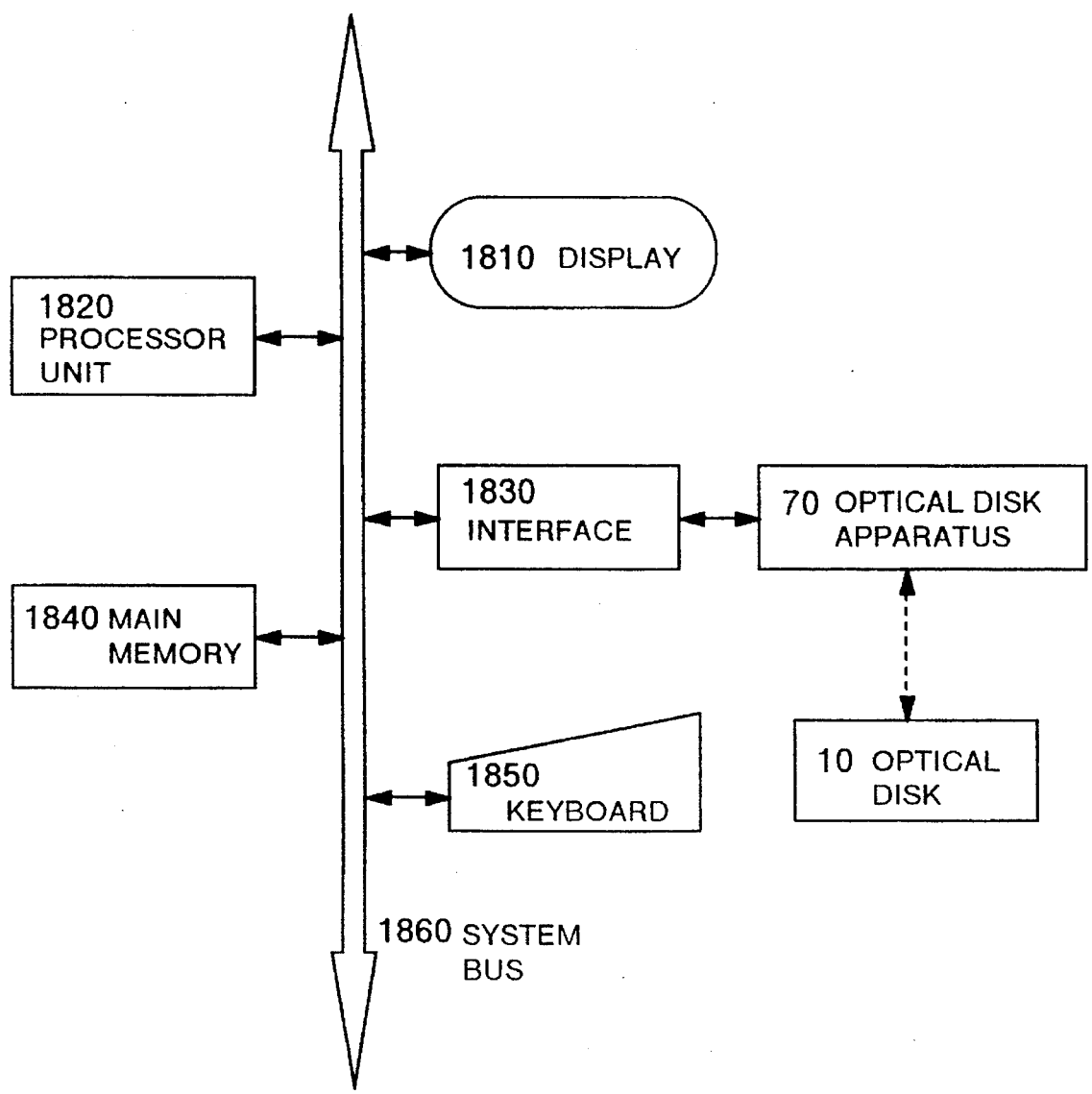
FIG. 23 is a block diagram showing a construction in the case where the optical disk apparatus of the present invention is connected to a note type personal computer.

FIG. 23 shows an embodiment of a system when the optical disk apparatus in each of the forgoing embodiments is connected to a personal computer.

A data processing section of the personal computer is composed of a processor unit 1820 and a main memory 1840 which may be a semiconductor memory. A keyboard 1850 and a display 1810 are connected to the data processing section through a system bus 1860. The system shown in FIG. 23 is characterized in that an optical disk apparatus 70 is connected through an interface 1830. In the case where the optical disk apparatus of the present embodiment as shown in FIG. 17 or 26 is used as the optical disk apparatus 70, a large capacity of data of 100 to 180 MB can be recorded on an optical disk 7 having the diameter of 64 mm. Thereby, it becomes possible for even a personal computer to process such a large scale or amount of data as processed by a work station. Also, since the optical disk 7 shown in FIG. 17 or 26 is detachable, it is possible to easily carry the optical disk having only data processed so that it is subjected to a compatible use in another apparatus.

Figure 24:
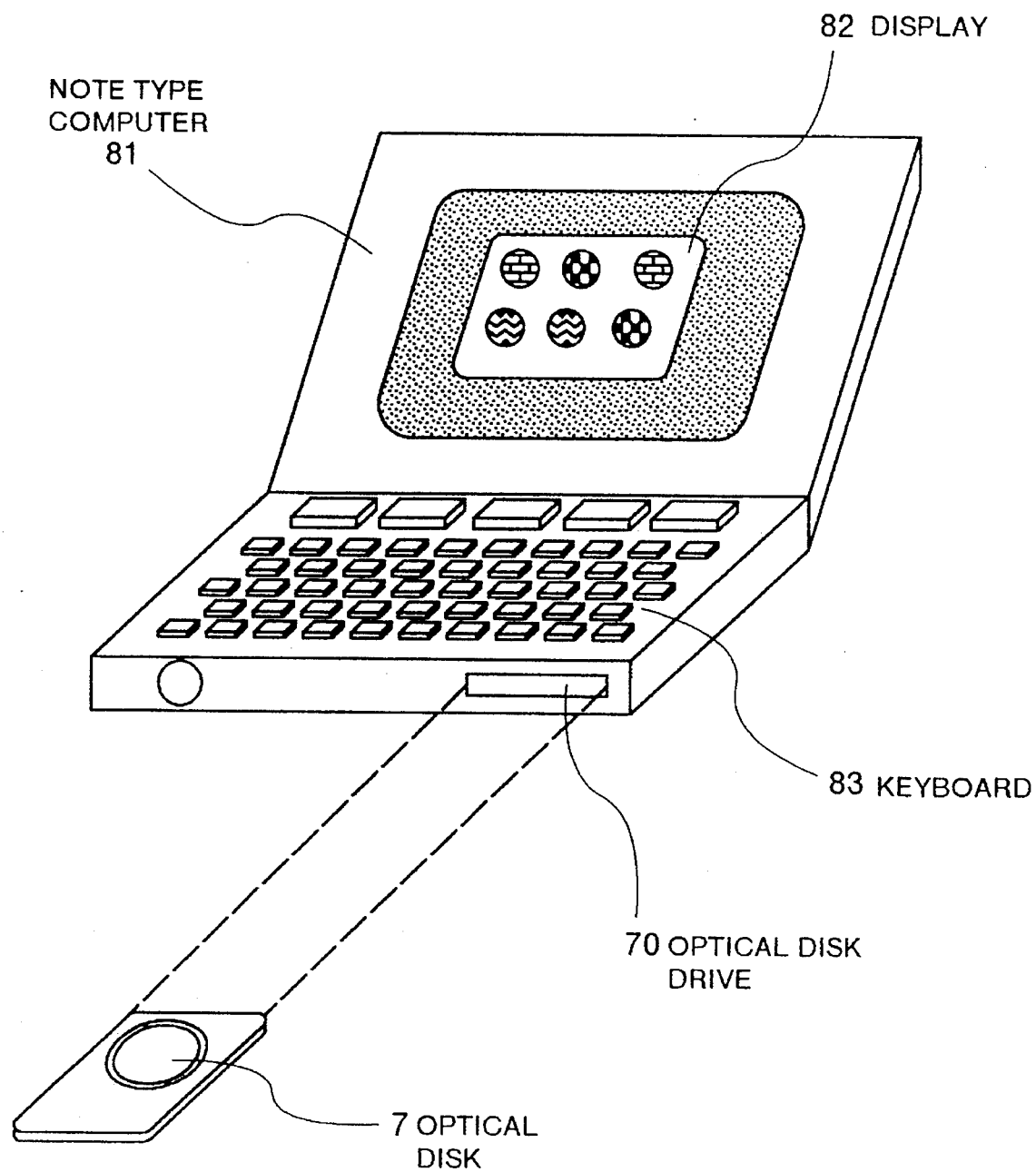
FIG. 24 is a view showing the external appearance of the optical disk apparatus of the present invention in the case where the optical disk apparatus is incorporated in a note type personal computer.

FIG. 24 shows an embodiment of a system in the case where the optical disk apparatus of the present embodiment shown in FIG. 17 or 26 is incorporated in a note type computer. The note type computer 81 includes a liquid crystal display 82 and a keyboard 83 and has an optical disk apparatus 70 incorporated therein. With the use of the optical disk apparatus of the present embodiment shown in FIG. 17 or 26 as the optical disk apparatus 70, a large capacity of data (see FIG. 18) recorded in an optical disk 7 can be reproduced or edited by the note type computer. Accordingly, it is possible to easily store and edit a large capacity of data such as voice, image or the like.

In each of the foregoing embodiments, an optical disk having the diameter of 64 mm is taken as one example. However, the size of a disk, the number of sectors, the number of segments, a modulating system and so forth can be changed properly. Also, by using an optomagnetic recording material such as TeFeCo as the recording material of the optical disk 7, it is possible to construct an optomagnetic type optical disk which has basically the same film construction as that in the above-mentioned optical disk 7.

Figure 6:
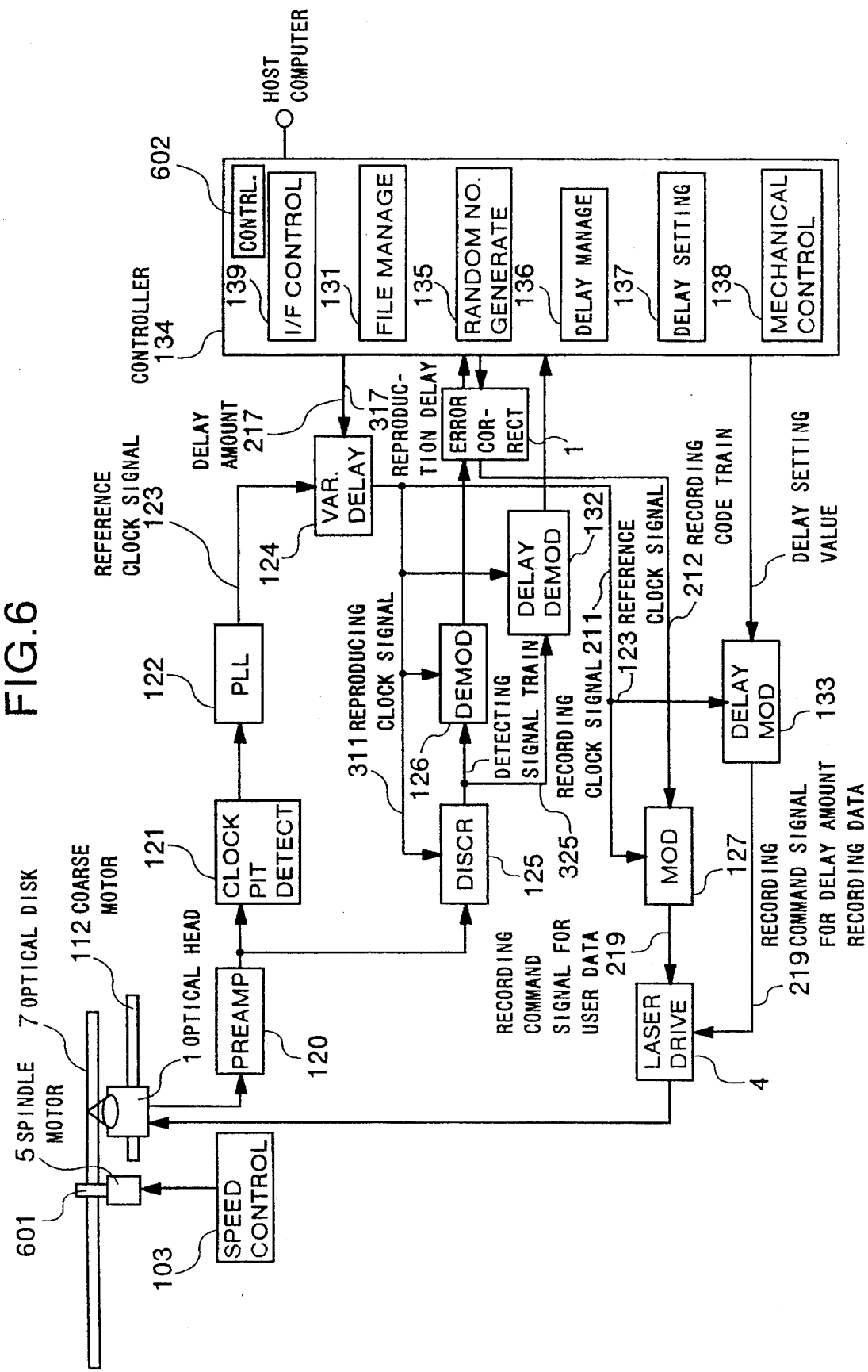
FIG. 6 is a diagram showing an embodiment of the optical disk apparatus of the present invention.
Figure 27:
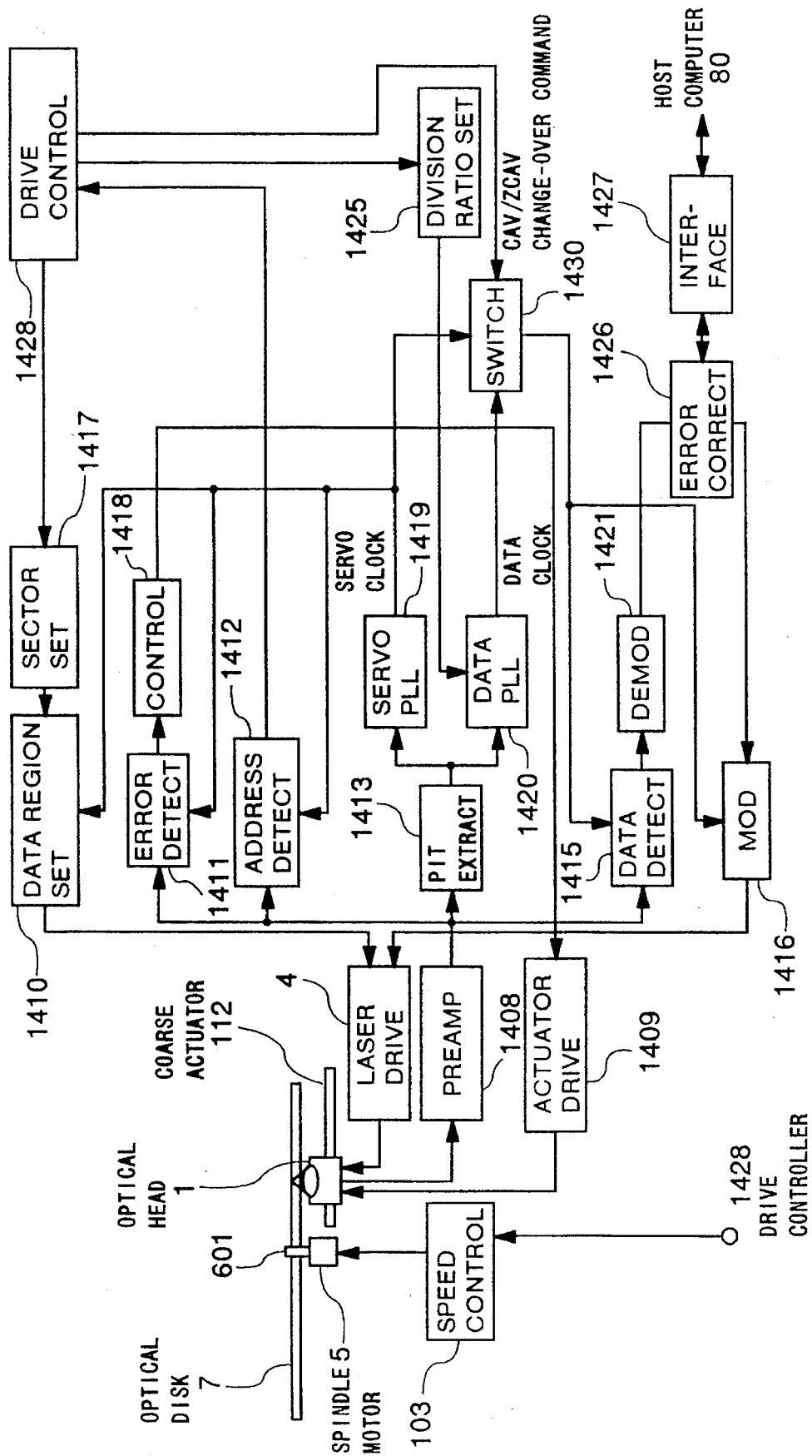
FIG. 27 is a diagram showing a furthermore embodiment of the optical disk apparatus of the present invention.

The optical disk apparatus shown in FIG. 17 or 6 includes the construction in which, in the case where an optical disk 7 subjected to recording based on the conventional CAV system is subjected to reproduction and in the case where the recording is to be made to an optical disk 7 on the basis of the CAV system, the drive controller 1428 gives an instruction for setting the same division ratio as that of the servo system PLL 1419 to the data system PLL 1420. With this construction, the frequency of a data clock signal set to the data detector 1415 and the modulator 1416 is made coincident with the frequency of a servo clock signal. Without limiting to such a construction, however, it is possible to use a construction as shown in FIG. 27 in which a switch 1430 is arranged between the servo system PLL 1419 and the data system PLL 1420 and the data detector 1415 and the modulator 1416 and is changed over by an instruction from the drive controller 1428. In the case where information indicating the recording based on the zone system is not recorded in the sector control information region, the drive controller 1428 at the time of reproduction from the optical disk 7 judges the recording as being made on the basis of the conventional CAV system and changes over the switch 1430 to the servo system PLL 1419 side so that a servo clock signal is inputted to the data detector 1415 and the modulator 1416. In the case where the recording is to be made to the optical disk 7 on the basis of the CAV system, too, the switch 1430 is changed over to the servo system PLL 1419 side. Thereby, in the case where the recording is to be made on the basis of the conventional CAV system, the setting of a division ratio to the data system PLL 1420 is not necessary since the data system PLL 1420 is not used. On the other hand, in the case where the recording is to be made on the basis of the zone system characteristic of the present embodiment, the switch 1430 is changed over to the data system PLL 1420 side and a division ratio corresponding to each zone is set to the data system PLL 1420.

Figure 28:
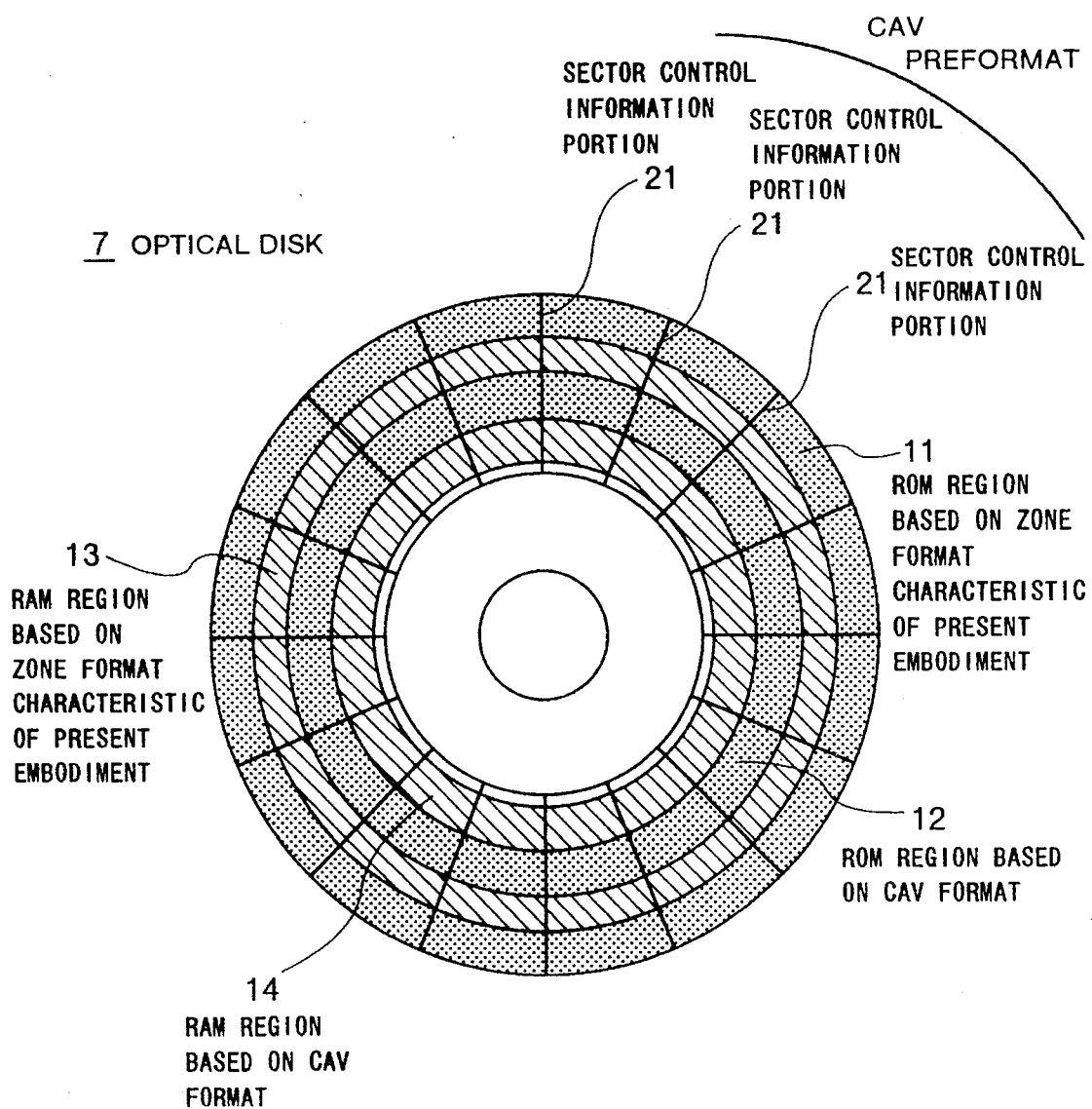
FIG. 28 is a diagram showing an embodiment in the case where an optical disk of the present invention is formatted.

As has already been mentioned, the optical disk apparatus of the present embodiment can perform the recording/reproduction on the basis of the CAV system and the zone system characteristic of the present embodiment. As the extension of this, it is possible to divide one optical disk 7 into a plurality of regions and to perform the recording on the basis of the CAV system or the zone system characteristic of the present embodiment while changing the recording/reproducing system for each region. On the other hand, in the optical disk apparatus of the present embodiment, since a servo system is a sample servo system in which a tracking error is detected from a train of pits formed in a recessed/raised form, it is possible to easily reproduce ROM type data formed by a pit train. Also, if a phase change type or optomagnetic type recording material is used as in the foregoing embodiments, it is possible to provide a recordable/reproducible RAM type construction formed with marks having different reflecting characteristics. Accordingly, it is possible to provide a construction, for example, as shown in FIG. 28, in which one optical disk 7 is concentrically divided into four regions including a region 11 as a ROM region formed with a pit train based on the zone system characteristic of the present embodiment, a region 12 as a ROM region formed with a pit train based on the CAV system, a region 13 as a RAM region formed with marks based on the zone system characteristic of the present embodiment and a region 14 as a RAM region formed with marks based on the CAV system, so that two different recording/reproducing system and two different medium materials (or ROM region and RAM region) coexist on one optical disk 7. Sector control information portions 21 and servo mark regions are radially arranged through the regions 11 to 14.

But, it is not possible to form a pit train on the optical disk 7 by the optical head of the optical disk apparatus shown in FIG. 17 or 26. Therefore, pits in the ROM region are beforehand formed by use of a device for forming pits in a recessed/raised form.

With such a construction, a well balanced optical disk 7 having a large storage capacity as the whole of a medium and a high reliability can be provided in such a manner that the recording based on the zone system characteristic of the present embodiment providing a high recording density is made for a ROM region formed with a pit train providing a relatively large S/N ratio while the recording based on the CAV system providing a low recording density is made for a RAM region formed with marks providing a relatively small S/N ratio.

Also, if a part of information in the ROM region recorded on the basis of the zone system characteristic of the present embodiment is recorded on the basis of the CAV system, it becomes possible to record/reproduce a part of information of the optical disk 7 shown in FIG. 28 by an optical disk apparatus based on the conventional CAV system, thereby providing a merit in the aspect of compatibility of the optical disk 7.

Also, it is possible to easily construct a medium which has a ROM region over the entire surface or a medium which has a RAM region over the entire surface as well as a medium as shown in FIG. 28 in which ROM and RAM regions coexist and the zone system characteristic of the present embodiment and the CAV system coexist. A feature common to those mediums lies in an optical disk medium with a high recording efficiency in which a servo system is a sample servo system with servo marks being radially arranged in a manner similar to those in the CAV system and at least a part of data is recorded on the basis of the zone system characteristic of the present embodiment with a higher recording density.

According to the present invention as mentioned above, there can be provided a recording method in which recording marks having plural or more different forms are recorded using an erasing power with suppressed thermal deterioration or any means for shifting the scanning center of a light beam, a high-density recording/reproducing system in which information is represented by use of recording marks having plural or more different forms, and an apparatus with an improved performance in which information is recorded and reproduced by use of recording marks having plural or more different forms.

Also, the deterioration of an information recording medium can be suppressed by shifting the mark position of write data and the reproduction of data from marks recorded with the shift is enabled by controlling a timing at the time of reproduction by the shift amount.

Further, since the reproduction from an optical disk medium can be made on the basis of a sample servo system, high-speed access is possible. Furthermore, it is possible to make the reproduction from an optical disk medium subjected to the recording of data with a recording density higher than that in the conventional CAV system.

We claim:

1. An optical disk apparatus comprising an optical recording medium having a tracking guide, an optical pickup section disposed opposite to said recording medium, a signal processing section for processing a signal received from said optical pickup section, a semiconductor laser driving section for controlling the setting of a power for irradiation of said recording medium with light and the ON/OFF of irradiation, a position control section for controlling the position of an optical pickup, a recording medium driving section for rotating said recording medium, a turn table for supporting said recording medium, a light beam control section for performing a control for irradiation of said recording medium with a recording light beam, and a system control section for introducing a control for the whole of a system and receiving external information, in which in accordance with a command from said position control section, said optical pickup is moved relative to a scanning center of a recording mark formed on a track of said recording medium in the direction of width of the track, a unit irradiation time or an irradiation start point defined at the time of formation of said recording mark is changed by said semiconductor laser driving section, and the intensity of irradiation light is changed by said light beam control section in accordance with a signal from said semiconductor laser driving section so as to enable recording of information.

2. An optical disk apparatus comprising an optical recording medium having a tracking guide, an optical pickup section disposed opposite to said recording medium, a signal processing section for processing a signal received from said optical pickup section, a semiconductor laser driving section for controlling the setting of a power for irradiation of said recording medium with light and the ON/OFF of irradiation, a position control section for controlling the position of an optical pickup, a recording medium driving section for rotating said recording medium, a turn table for supporting said recording medium, a light beam control section for performing a control for irradiation of said recording medium with a recording light beam, and a system control section for introducing a control for the whole of a system and receiving external information, in which said light beam control section includes irradiation time setting means for setting an irradiation time of said light beam which is equal to or shorter than 1/A of that required at the time of formation of a recording mark, A being a natural number, irradiation start point setting means for arbitrarily changing an irradiation start point of time, and irradiation power setting means for setting an irradiation power having an erasing action.

3. An optical disk apparatus comprising an optical recording medium having a tracking guide, an optical pickup section disposed opposite to said recording medium, a signal processing section for processing a signal received from said optical pickup section, a semiconductor laser driving section for controlling the setting of a power for irradiation of said recording medium with light and the ON/OFF of irradiation, a position control section for controlling the position of an optical pickup, a recording medium driving section for rotating said recording medium, a turn table for supporting said recording medium, a light beam control section for performing a control for irradiation of said recording medium with a recording light beam, and a system control section for introducing a control for the whole of a system and receiving external information, in which said light beam control section includes a recording portion in which the dependency of a magnetization reversal rate or a crystal growth rate on an irradiation power of said light beam is beforehand recorded for said recording medium, said light beam control section determining and controlling an irradiation power and an irradiation time of said light beam in accordance with said recording medium and information to be recorded.

4. A recording method of recording information with a light beam converged on an information recording medium, comprising the steps of:

(a) moving an optical head for generating the light beam in a track width direction relative to a scanning center of a recording mark formed on a track of the recording medium;

(b) determining at least one of an irradiation extent time and an irradiation start point for recording, in response to at least one of an original irradiation extent time and an original irradiation start point which are both set at a time of forming a recording mark; and (c) recording different information on each of recording marks by using at least one of the determined irradiation extent time and the determined irradiation start point, and driving the optical head.

5. A recording method of forming a new recording mark with use of a previously formed recording mark by converging a light beam on an information recording medium, comprising the steps of:

(a) controlling a size of the light beam so that the size becomes smaller than that of the previously formed recording mark;

(b) determining at least one of an irradiation extent time and an irradiation start point for a new recording mark; and (c) recording different information on each of the recording marks by using at least one of the determined irradiation extent time and the determined irradiation start point, and driving the optical head.

6. A recording method according to claim 5, wherein the step (b) includes determining a change amount of the irradiation start point and a change amount of the irradiation extent time for forming the new recording mark, referring to a scanning center of a light beam determined at a time of forming the previously formed recording mark, the irradiation extent time and the irradiation start point.

7. A recording method according to claim 5, wherein the step (b) includes determining a change amount of the irradiation extent time without changing the irradiation start point for forming the new recording mark, referring to a scanning center of a light beam determined at a time of forming the previously formed recording mark, the irradiation extent time and the irradiation start point.

8. A recording method of forming a new recording mark with use of a previously formed recording mark by converging a light beam on an information recording medium, comprising the steps of:

(a) setting a size of the light beam so that the size becomes smaller than that of the previously formed recording mark;

(b) displacing the light beam in a track width direction;

(c) setting an irradiation extent time of the light beam to a time shorter than an irradiation extent time at a time of forming the previously formed recording mark;

(d) determining arbitrarily an irradiation start time of the light beam; and (e) setting an irradiation power of the light beam to a power for generating an erasure operation.

9. A recording method according to claim 8, further comprising the step of:

(f) changing an irradiation start point of the light beam.

10. A recording method of forming a recording mark by converging a light beam on an information recording medium, comprising the steps of:

(a) determining a shape of a recording mark in response to a relation of a dependency of a light beam irradiation power to at least one of a magnetization reversal speed and a crystal growth speed of a material forming the recording medium;

(b) determining the light beam irradiation power for use in accordance with information to be recorded; and (c) recording information with the determined irradiation power.

* * * * *